US012587921B2

(12) United States Patent
Awada et al.

(10) Patent No.: US 12,587,921 B2
(45) Date of Patent: Mar. 24, 2026

(54) STORING BEAM RELATED INFORMATION OF USED BEAM AT THE TIME OF INITIATING THE TIME-TO-TRIGGER PROCEDURE

(71) Applicant: Nokia Technologies OY, Espoo (FI)

(72) Inventors: Ahmad Awada, Munich (DE); Umur Karabulut, Munich (DE); Andreas Lobinger, Munich (DE); Ingo Viering, Munich (DE); Henrik Martikainen, Jyvaskyla (FI)

(73) Assignee: Nokia Technologies Oy, Espoo (FI)

( * ) Notice: Subject to any disclaimer, the term of this patent is extended or adjusted under 35 U.S.C. 154(b) by 530 days.

(21) Appl. No.: 18/000,595

(22) PCT Filed: May 27, 2021

(86) PCT No.: PCT/IB2021/054661
§ 371 (c)(1),
(2) Date: Dec. 2, 2022

(87) PCT Pub. No.: WO2021/245508
PCT Pub. Date: Dec. 9, 2021

(65) Prior Publication Data
US 2023/0308964 A1     Sep. 28, 2023

(30) Foreign Application Priority Data
Jun. 4, 2020     (EP) .................................... 20178224

(51) Int. Cl.
*H04W 36/00*          (2009.01)

(52) U.S. Cl.
CPC . *H04W 36/00837* (2018.08); *H04W 36/0058* (2018.08)

(58) Field of Classification Search
CPC ....... H04W 36/00837; H04W 36/0058; H04W 24/02; H04W 36/0085; H04B 7/0695; H04B 7/0617; H04B 7/0632
See application file for complete search history.

(56) References Cited

U.S. PATENT DOCUMENTS 9,668,189 B2      5/2017   Wang et al.
2017/0055187 A1*  2/2017   Kang ................ H04W 36/0058
(Continued)

FOREIGN PATENT DOCUMENTS

EP          3242509 A1    11/2017
WO     WO-2018/082904 A1     5/2018
(Continued)

OTHER PUBLICATIONS

Notice of Allowance received for corresponding European Patent Application No. 20178224.0, dated Apr. 9, 2024, 8 pages.
(Continued)

*Primary Examiner* — Quoc Thai N Vu
(74) *Attorney, Agent, or Firm* — Lippes Mathias LLP

(57)          ABSTRACT

The mobile device includes at least one memory storing computer program code and at least one processor configured to execute the computer program code and cause the mobile device to perform, initiating a time-to-trigger procedure for evaluating a measurement event condition with respect to a serving cell and/or a neighboring cell of a mobile network; storing information related to a beam, which is or was used by the mobile device at the time of initiating the time-to-trigger procedure; and providing the stored beam related information to the mobile network.

8 Claims, 12 Drawing Sheets

(56) References Cited

U.S. PATENT DOCUMENTS

| | | | | |
|---|---|---|---|---|
| 2019/0052342 A1* | 2/2019 | Määttanen | ............ | H04W 76/18 |
| 2019/0268782 A1 | 8/2019 | Martin et al. | | |
| 2019/0313273 A1 | 10/2019 | Sharma et al. | | |
| 2019/0313314 A1* | 10/2019 | Yang | ..................... | H04W 24/10 |
| 2020/0083946 A1* | 3/2020 | You | ....................... | H04W 76/11 |
| 2023/0208496 A1 | 6/2023 | Viering et al. | | |

FOREIGN PATENT DOCUMENTS

| | | |
|---|---|---|
| WO | WO-2018/084776 A1 | 5/2018 |
| WO | 2019/003059 A1 | 1/2019 |
| WO | 2019/170210 A1 | 9/2019 |
| WO | 2019/245290 A1 | 12/2019 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.0.0, Dec. 2019, pp. 1-366.

"3rd Generation Partnership Project; Technical Specification Group Radio Access Network; Evolved Universal Terrestrial Radio Access Network (E-UTRAN); X2 application protocol (X2AP) (Release 16)", 3GPP TS 36.423, V16.0.0, Dec. 2019, pp. 1-432.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.8.0, Dec. 2019, pp. 1-964.

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.

"3rd Generation Partnership Project; Technical Specification Group Radio Access Network; NR; Requirements for support of radio resource management (Release 16)", 3GPP TS 38.133, V16.2.0, Dec. 2019, 1130 pages.

"3rd Generation Partnership Project; Technical Specification Group Radio Access Network; NG-RAN; Xn application protocol (XnAP) (Release 16)", 3GPP TS 38.423, V16.0.0, Dec. 2019, 330 pages.

"3rd Generation Partnership Project; Technical Specification Group Services and System Aspects; System architecture for the 5G System (5GS); Stage 2 (Release 16)", 3GPP TS 23.501, V16.3.0, Dec. 2019, pp. 1-417.

"3rd Generation Partnership Project; Technical Specification Group Radio Access Network; Study on RAN-centric data collection and utilization for LTE and NR (Release 16)", 3GPP TR 37.816, V16.0.0, Jul. 2019, pp. 1-35.

"IEEE 802.3", Wikipedia, Retrieved on Dec. 2, 2023, Webpage available at : https://en.wikipedia.org/wiki/IEEE_802.3.

"IEEE Standard for Local and Metropolitan Area Networks—Bridges and Bridged Networks—Amendment 31: Stream Reservation Protocol (SRP) Enhancements and Performance Improvements", IEEE Computer Society, IEEE Std 802.1Qcc™M-2018, 2018, 208 pages.

"Remaining issues on measurement report content", 3GPP TSG RAN WG2 Meeting #99, R2-1708779, Agenda: 10.4.1.4.2, Intel Corporation, Aug. 21-25, 2017, pp. 1-4.

"IEEE Standard for Local and metropolitan area networks—Part 16: Air Interface for Broadband Wireless Access Systems—Amendment 3: Advanced Air Interface", IEEE Computer Society and the IEEE Microwave Theory and Techniques Society, IEEE Std 802.16m™, May 6, 2011, 1106 pages.

Extended European Search Report received for corresponding European Patent Application No. 20178224.0, dated Nov. 4, 2020, 8 pages.

Office action received for corresponding European Patent Application No. 20178224.0, dated Sep. 11, 2023, 5 pages.

3rd Generation Partnership Project; Technical Specification Group Radio Access Network; Evolved Universal Terrestrial Radio Access (E-UTRA); Radio Resource Control (RRC); Protocol specification (Release 12) 11, 3GPP Standard; 3GPP TS 36.331, 3rd Generation Partnership Project (3GPP), Mobile Competence Centre ; 650, Route Des Lucioles ; F-06921 Sophia-Antipolis Cedex ; France, vol. RAN WG2, No. VI2.10.0, Jul. 1, 2016 (Jul. 1, 2016), pp. 1-456.

International Search Report for International Application No. PCT/IB2021/054661 dated Aug. 4, 2021.

* cited by examiner

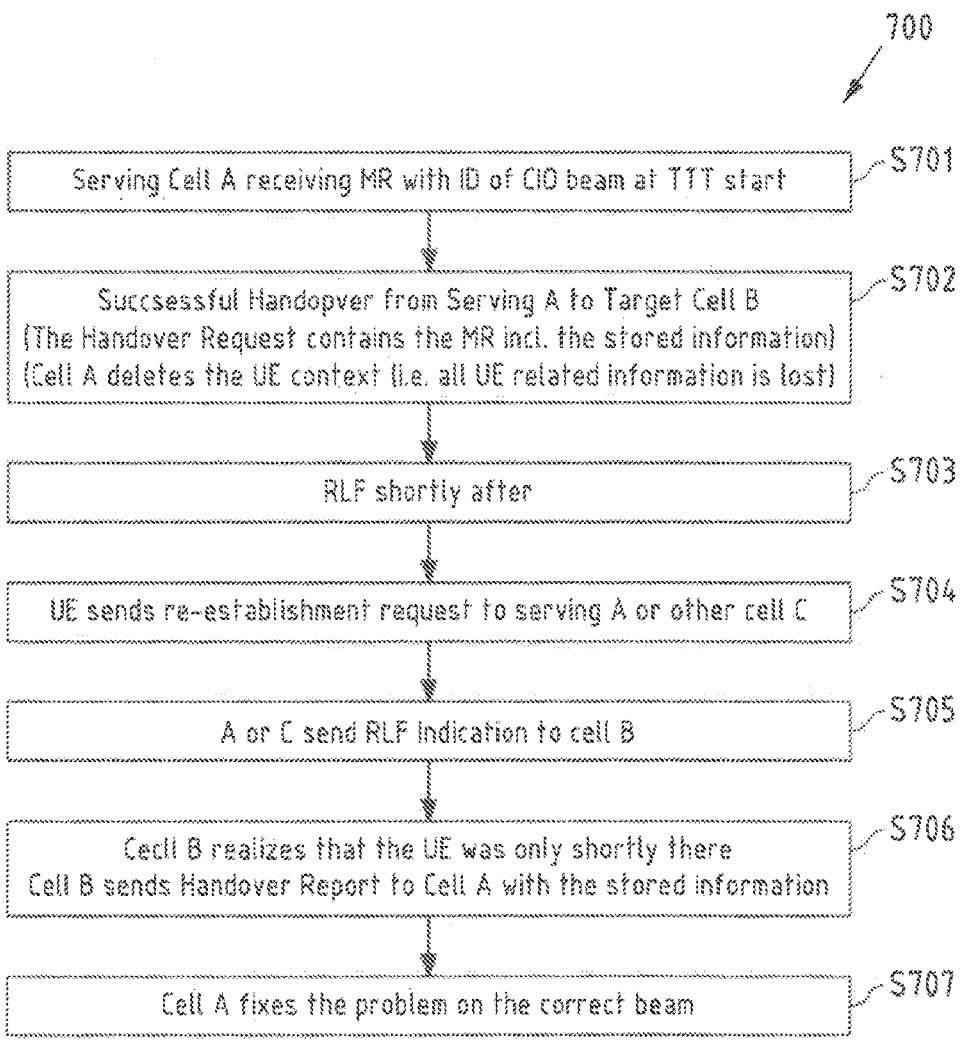

700

S701
Serving Cell A receiving MR with ID of CIO beam at TTT start

S702
Succsessful Handopver from Serving A to Target Cell B
(The Handover Request contains the MR incl. the stored information)
(Cell A deletes the UE context I.e. all UE related information is lost)

S703
RLF shortly after

S704
UE sends re-establishment request to serving A or other cell C

S705
A or C send RLF indication to cell B

S706
Cecll B realizes that the UE was only shortly there
Cell B sends Handover Report to Cell A with the stored information S707
Cell A fixes the problem on the correct beam

S801 — Serving Cell A receiving MR with ID of CIO beam at TTT start

S802 — UE receives HO Command for handover to target cell B

S803 — Handover Failure (eé.g. target still weak and RACH fails)

S804 — UE sends re-establishment request to target

S805 — Target cell B send RLF indication to cell A

S806 — Cell A fixes the problem on the correct beam (it still has the MR)

900

1000

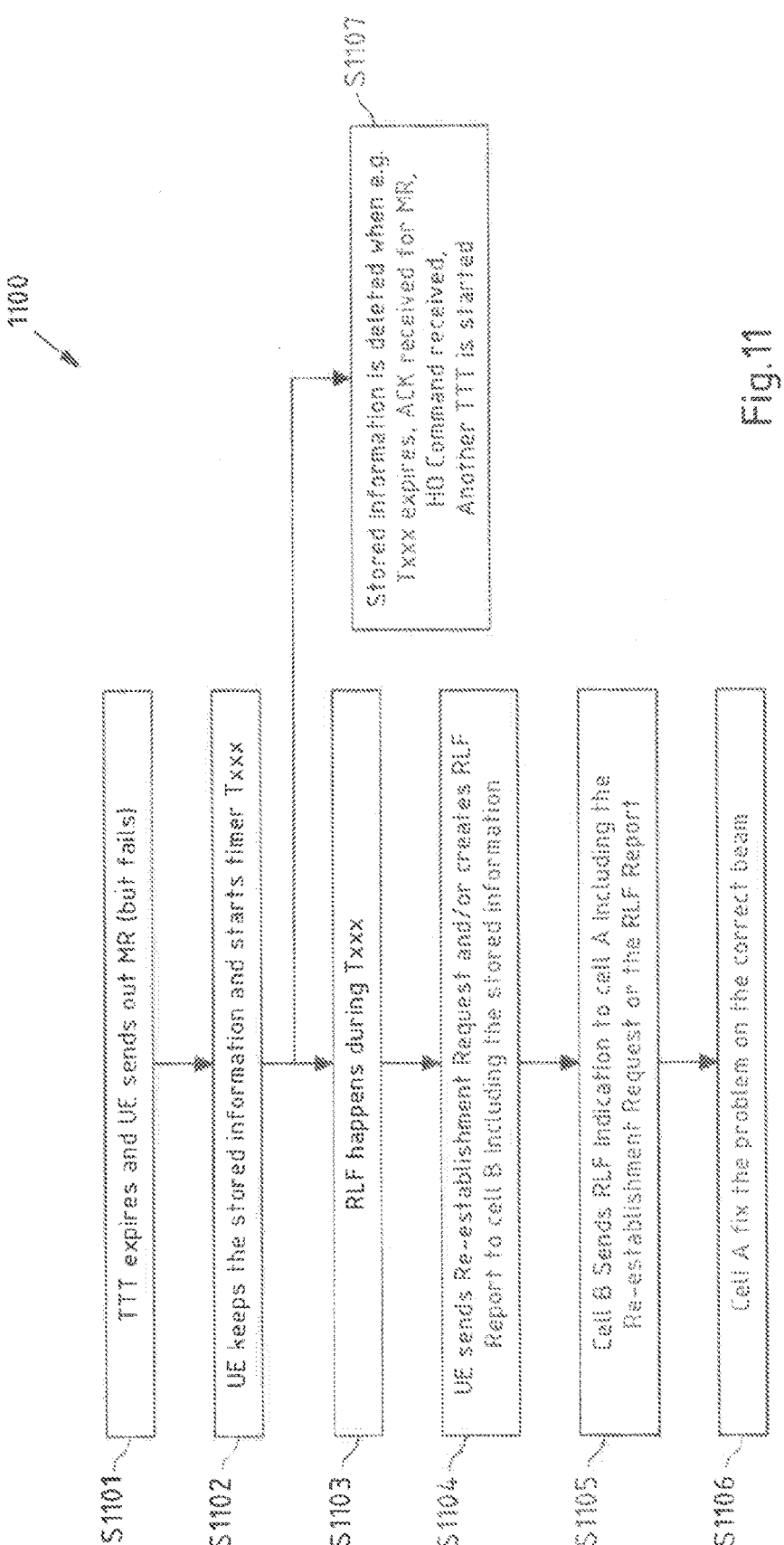

1100

S1101   TTT expires and UE sends out MR (but fails)

S1102   UE keeps the stored information and starts timer Txxx

S1103   RLF happens during Txxx

S1104   UE sends Re-establishment Request and/or creates RLF Report to cell B including the stored information S1105   Cell B Sends RLF indication to cell A including the Re-establishment Request or the RLF Report S1106   Cell A fix the problem on the correct beam S1107   Stored information is deleted when e.g. Txxx expires, ACK received for MR, HO Command received, Another TTT is started

Fig. 11

STORING BEAM RELATED INFORMATION OF USED BEAM AT THE TIME OF INITIATING THE TIME-TO-TRIGGER PROCEDURE

CROSS-REFERENCE TO RELATED APPLICATIONS

This application is a national phase under 35 U.S.C. § 371 of PCT International Application No. PCT/IB2021/054661 which has an International filing date of May 27, 2021, which claims priority to European Application No. 20178224.0, filed Jun. 4, 2020, the entire contents of each of which are hereby incorporated by reference.

TECHNOLOGICAL FIELD

The present disclosure relates to wireless communications, and more particularly to the mobility and handover procedures in wireless and in particular cellular communication networks, e.g. the handover of a mobile device from a source cell to a target cell, and the optimization thereof.

BACKGROUND

The so-called Mobility Robustness Optimization (MRO) is a method to optimize mobility parameters in order to minimize failures, unnecessary handovers, etc., so that mobility in cellular and mobile communication networks can be provided.

In conventional networks, MRO may for instance optimize the "cell-individual offset" (CIO) which is one of the main mobility parameters controlling the handover (HO). A source cell configures different CIOs for different neighbors in the cell, i.e. the network can control the handover separately for every cell pair. With conventional MRO, the network basically collects statistics for respective cell boundaries. For instance, a boundary dominated by a fast-moving road may show failures due to "too late handovers" caused by the fast users on the street, whereas a boundary dominated by pedestrians may show "too early handovers" or ping-pongs caused by the slow or static pedestrians. Using the CIO, the network can react by configuring a large CIO on the street dominated boundary causing early handovers avoiding RLFs, or a low CIO for the pedestrian-dominated boundary causing late handovers avoiding ping-pongs.

Instead of CIO, the network may also configure different time-to-trigger (TTT) intervals for different neighbors. Generally speaking, the TTT is supposed to make sure that the handover or entry condition needs to be fulfilled during this interval in order to avoid unnecessary (and in particular to early) handovers. In one approach, an alternative TTT has been introduced together with a list of neighbor cell IDs so that the user equipment (UE) will apply the alternative TTT instead when the entry condition is triggered by one member of the list. In principle, this can also be applied in a similar way as the CIO. An alternative, shorter TTT can be configured for those neighbors with high speed boundaries and automatic optimization can follow the same MRO principles as described above for the CIO.

Today's MRO procedures are designed to identify that the source cell at the time of handover has done an undesired handover decision, and to enable the source cell to correct them. To this end, the 3GPP standard has introduced several messages between network base stations via the so called X2 interface, such as RLF Indication and Handover Report.

Additionally, in the frame of New Radio (NR) air interface for the 5G mobile network, the use of beamforming methods becomes important, in particular due to a spectrum at larger frequencies where more severe propagation conditions have to be compensated by beamforming gain. The beams increase the spatial resolution from cell (pair) level to beam (pair) level.

The above approach can generally be transferred to a beam-specific optimization. When extending MRO to be beam-specific as described above, it also has to identify, which of the beam specific CIOs has to be changed, i.e. which is the specific beam of a cell that should correct its parameter settings. For this, the network may set up beam-specific handover statistics, optimize different CIO for different beam (pair) s and configure different CIOs depending on the beams that the UE is moving in.

In the above approaches the UE is not involved. This implies that the network has to reconfigure the UE with a new CIO whenever the UE is switched to a new cell or beam. Furthermore, the network has to make its evaluation with the existing information at hand.

However, it has been observed, that the present approaches currently employed for MRO may lead to undesired decisions in the optimization, such as a change of parameters of the wrong cells or beams due to a moving UE in particular during the TTT.

Therefore, there inter alia exists the need for further improving the handover procedure and the optimization thereof. Thus, it may be an object of embodiments disclosed herein to allow for an improved optimization of the handover procedure. It may further be an object to effectively avoid undesired effects during handover procedures such as ping-pong effects, too early handovers, too late handovers and/or radio link failures.

SUMMARY OF SOME EXEMPLARY EMBODIMENTS

According to a first exemplary aspect of the present disclosure, a mobile device is disclosed, the mobile device comprising:
  means for initiating a time-to-trigger procedure for evaluating a measurement event condition with respect to a serving cell and/or a neighboring cell of a mobile network;
  means for storing information related to a beam, which is or was used by the mobile device at the time of initiating the time-to-trigger procedure; and
  means for providing the stored beam related information to the mobile network.

The mobile device of the first aspect may be a terminal or user equipment (also referred to as UE) of a mobile network. The mobile device may for instance be a smart phone, a tablet, a wearable, a smartwatch or the like. The mobile device may also be a vehicle or implemented in a vehicle. Further, the mobile device may be an IoT device or a sensor (as for instance used for manufacturing processes or in the framework of smart cities). In any case, the mobile device of the first aspect may in particular be configured for communicating in and with a cellular mobile communication network.

According to a second exemplary aspect of the present disclosure, a Radio Access Network, RAN, node is disclosed, the RAN node comprising:
  means for obtaining information related to a beam, which is or was used by a mobile device at the time of initiating a time-to-trigger procedure for evaluating a measurement event condition with respect to a serving
cell and/or a neighboring cell of a mobile network; and
means for using said obtained beam related information
when optimizing a beam parameter related to handover
procedures.

The Radio Access Network (RAN) Node of the second
aspect may in particular be a stationary device. The RAN
node may in particular be a base station, a radio access point
or a transmission and/or reception point (or a part thereof),
e.g. of a cellular mobile communication network. Examples
of cellular mobile communication networks are for instance
a third generation (3G, for instance the Universal Mobile
Tele-communication System, UMTS, WCDMA,
TD-SCDMA or CDMA-2000), fourth generation (4G, for
instance the Long Term Evolution, LTE, system, the LTE
Advanced (LTE-A) system or the IEEE 802.16m WiMAX
system), fifth generation (5G, for instance the Next Genera-
tion Mobile Networks, NGMN system) or any future gen-
eration mobile communication network. Accordingly, non-
limiting examples of a RAN node are a base transceiver
station (BTS), a Node B (NB), an evolved Node B (eNB) or
a next generation Node B (gNB) or a part thereof. The RAN
node may also be or comprise one or more entities or units
of a base station realized in a distributed fashion, such as a
central unit (CU), a distributed unit (DU) and a remote radio
head (RRH), as provided in a gNB of a 5G network, for
instance. Thus, the RAN node of the second aspect may in
particular be understood to constitute (together with further
apparatuses or RAN nodes) a cellular mobile communica-
tion network. The RAN node (alone or together with further
apparatuses) may for instance operate a cell (e.g. the serving
cell) of a cellular communication network. In any case, the
RAN node of the second aspect may in particular be
configured for communicating with the mobile device.

The means of any of the disclosed apparatuses (i.e. the
mobile device and the RAN node) can be implemented in
hardware and/or software. They may comprise for instance
at least one processor for executing computer program code
for performing the required functions, and at least one
memory storing the program code. Alternatively, they could
comprise for instance circuitry that is designed to implement
the required functions, for instance implemented in a chipset
or a chip, like an integrated circuit. In general, the means
may comprise for instance one or more processing means or
processors.

Thus, according to the present disclosure, there is also
disclosed a mobile device and RAN node in each case
comprising at least one processor and at least one memory
including computer program code, the at least one memory
and the computer program code configured to, with the at
least one processor, cause the mobile device and the RAN
node, respectively, at least to perform and/or to control a
method according to the respective exemplary aspect of the
present disclosure.

The disclosed apparatuses may comprise the disclosed
components, for instance means, processor, memory, or may
further comprise one or more additional components.

According to the first exemplary aspect of the present
disclosure, there is also disclosed a method, performed by at
least a mobile device, the method comprising:
    initiating a time-to-trigger procedure for evaluating a
        measurement event condition with respect to a serving
        cell and/or a neighboring cell of a mobile network;
    storing information related to a beam, which is or was
        used by the mobile device at the time of initiating the
        time-to-trigger procedure; and providing the stored beam related information to the
        mobile network.

According to the second exemplary aspect of the present
disclosure, there is also disclosed a method, performed by at
least a Radio Access Network, RAN, node, the method
comprising:
    obtaining information related to a beam, which is or was
        used by a mobile device at the time of initiating a
        time-to-trigger procedure for evaluating a measurement
        event condition with respect to a serving cell and/or a
        neighboring cell of a mobile network; and
    using said obtained beam related information when opti-
        mizing a beam parameter related to handover proce-
        dures.

The method according to the first and second aspect may
for instance be performed and/or controlled by a mobile
device and RAN node as described above, respectively.

According to the first exemplary aspect of the present
disclosure, there is also disclosed a computer program, the
computer program when executed by a processor of a
mobile device causing said mobile device to perform a
method comprising:
    initiating a time-to-trigger procedure for evaluating a
        measurement event condition with respect to a serving
        cell and/or a neighboring cell of a mobile network;
    storing information related to a beam, which is or was
        used by the mobile device at the time of initiating the
        time-to-trigger procedure; and
    providing the stored beam related information to the
        mobile network.

According to the second exemplary aspect of the present
disclosure, there is also disclosed computer program, the
computer program when executed by a processor of a Radio
Access Network, RAN, node causing said RAN node to
perform a method comprising:
    obtaining information related to a beam, which is or was
        used by a mobile device at the time of initiating a
        time-to-trigger procedure for evaluating a measurement
        event condition with respect to a serving cell and/or a
        neighboring cell of a mobile network; and
    using said obtained beam related information when opti-
        mizing a beam parameter related to handover proce-
        dures.

The computer program according to the first or second
aspect may be stored on computer-readable storage medium,
in particular a tangible and/or non-transitory medium. The
computer readable storage medium could for example be a
disk or a memory or the like. The computer program could
be stored in the computer readable storage medium in the
form of instructions encoding the computer-readable storage
medium. The computer readable storage medium may be
intended for taking part in the operation of a device, like an
internal or external memory, for instance a Read-Only
Memory (ROM) or hard disk of a computer, or be intended
for distribution of the program, like an optical disc.

According to a third aspect of the present disclosure, a
system comprising a mobile device (e.g. the mobile device
of the first aspect, such as a smartphone) and a Radio Access
Network, RAN, node in (e.g. the RAN node according to the
second aspect, such as a gNB) configured to cooperate is
disclosed and comprising:
    means for initiating a time-to-trigger procedure for evalu-
        ating a measurement event condition with respect to a
        serving cell and/or a neighboring cell of a mobile
        network;

means for storing information related to a beam, which is or was used by the mobile device at the time of initiating the time-to-trigger procedure;

means for providing the stored beam related information to the mobile network;

means for obtaining the beam related information; and means for using said obtained beam related information a when optimizing a beam parameter related to handover procedures.

In the following, exemplary features and exemplary embodiments of the above aspects of the present disclosure will be described in further detail.

Generally, in case of a handover, the serving cell is referred to as the source cell of the handover, and the neighboring cell, towards which a handover is requested, is referred to as the target cell of the handover. A handover from a source cell (in the following more generally also referred to as a serving cell) to a target cell (in the following more generally also referred to as neighboring cell before the handover) of a network, may only take place if a certain condition is fulfilled or event takes place. Such a condition may be referred to as the entry condition. An entry condition may comprise that a certain quality or parameter of a neighboring cell is expected to be better (or better than a predefined offset) than the present serving cell. An exemplary condition or event is the so called "A3 event", according to which the reception (e.g. received signal strength) at the mobile device of a neighboring cell (i.e. a target cell of a potential handover) becomes better (and in particular a certain offset better) than the one of the present serving cell (i.e. the source cell of a potential handover). The offset in this condition may be a cell individual offset (so-called CIO) or a beam-specific CIO, in case beam forming is employed by the network, as will be explained in more detail below.

A respective measurement of the reception of observable cells is typically performed by a mobile device (e.g. triggered by the mobile device itself or requested by the network) and sent to the network as a measurement report (also referred to as MR). A measurement may in particular comprise information representative of a signal quality (e.g. the signal strength) of one or more observable cells. However, generally, a measurement report may also comprise additional or other information (such as a channel busy ratio, for instance).

By introducing the (in particular beam-specific) CIO it can be made sure that a handover is performed at a condition, in which the received signal strength of (in particular a beam of) a serving cell and (in particular a beam of) a neighboring cell are in a desired relation to each other, i.e. the received signal strength of the respective cells is first corrected by the respective offset before they are compared to each other.

The entry condition for the handover can further be refined by introducing a so-called time-to trigger or time-to-trigger procedure (as TTT). A time-to-trigger or time-to-trigger procedure for evaluating a measurement event condition may generally be understood to mean that the respective measurement event condition is evaluated with regard to the time-to-trigger procedure. For instance, a respective measurement event condition may be considered fulfilled (and thus a respective measurement event may be triggered) only if the respective a measurement event condition (also referred to an entry condition or a triggering requirement) is fulfilled during the time-to-trigger procedure, i.e. within a certain time interval defined by the time-to-trigger procedure. A measurement event is in particular understood to mean that a measurement report may be generated by the mobile device and/or sent to the mobile network. The network (and in particular the respective RAN node) may then in turn initiate a handover from the serving cell (as said, also referred to as "source cell" in case of a handover) to the neighboring cell (as said, also referred to as "target cell" in case of a handover). Such a time interval may be defined by a respective time-to-trigger value. Accordingly, initiating a time-to-trigger procedure may in particular comprise starting a timer, which is running for a certain predefined time, before a measurement report is actually triggered (i.e., notified to the network) in case the corresponding entry condition is still fulfilled at the end of the time-to-trigger, i.e. when the timer ends. Thus, for instance, it may be checked whether the entry condition or triggering requirement is at least fulfilled at the beginning and at the end of the time interval defined by the time-to-trigger procedure. Additionally or alternatively, it may be repeatedly checked during the time interval defined by the time-to-trigger procedure, whether the respective entry condition or triggering requirement is still fulfilled. Accordingly, in one example, the measurement event condition may repeatedly evaluated during the time-to-trigger procedure.

In one example, the disclosed methods may thus further comprise (e.g. repeatedly) evaluating the measurement event condition during the time-to-trigger procedure. In one example, the disclosed methods may thus further comprise determining that the measurement event condition (such as the A3, A6 or C2 entry condition or any other suitable entry condition) potentially leading to a handover from a source cell to a target cell of a network is fulfilled. As explained above, it may in particular be repeatedly checked during the time-to-trigger procedure, whether the respective condition is fulfilled. Only in response to this, the time-to-trigger procedure may then be initiated.

In case of the A3 condition the neighboring cell becomes a respective offset better than the serving cell. In case of the A6 condition the neighboring cell becomes a respective offset better than serving cell. In case of the C2 condition the CSI-RS resource becomes a respective offset better than a reference CSI-RS resource. However, generally other conditions may likewise be used as a measurement event condition.

A beam used by the mobile device is in particular understood to mean that the mobile device establishes a radio link connection via this beam of a particular cell or base station to the network and that the mobile device may communicate with the network via this beam.

Information related to a beam may in particular be any information, which may allow an identification of the beam, which was used by the mobile device at the time of initiating the time-to-trigger procedure. This beam may still be in use at the time the handover is performed, or a new beam may be selected by the mobile device while the TTT procedure is running and before the handover is performed.

Therein, the term beam may be understood to refer to an intentionally created electromagnetic wave radiation or propagation pattern directed into one or more specific directions, typically created by means of a set of antennas (e.g. an antenna array). In other words, the signal strength of the radiation pattern (i.e. the beam(s)) can be specially formed in such a way that the radiated energy in the direction of the mobile device is much stronger than in the other directions. The stored beam related information can then be provided to the network, e.g. by sending the information to a base station of the network. There may also be different beam configurations or beamforming configurations depending on the situation, e.g. depending on whether data is transmitted or received. For instance, there may be a transmit beamforming configuration used at the transmitting side (e.g. at the RAN node for downlink, at the mobile device for uplink) and/or a receive beamforming configuration used at the receiving side (e.g. at the mobile device for downlink, at the RAN node for uplink).

Accordingly, the beam related information can then be obtained by the network, e.g. received by a base station of the network and considered when changing and optimizing one ore multiple parameters of the respective beam related to handover procedures, e.g. in the scope of a so-called mobility robustness optimization (MRO).

The obtained beam related information can advantageously be used, when optimizing a parameter of the beam related to handover procedures. This may take place with any suitable MRO approach. Parameters which may be optimized may in particular be (e.g. beam specific) cell individual offset (CIO), which may be increased or decreased, or a TTT parameter, such as the value of the TTT timer, which may be increased or decreased. Further exemplary parameters are the cell specific offset, a frequency specific offset and/or a hysteresis value.

As will become more apparent from the examples provided further below, the described approach is advantageous, because the network can identify the beam, which was used at the time when TTT was initiated, as the beam related information is saved and provided to the network. This information is useful when optimizing the handover parameters of the cell or beam, in case of mobility problems (i.e. a problem during handover such as a too late or too early handover). At the same time, the complexity of the described approach is limited, since the mobile device, such as the UE, only has to store the beam related information (such as an identifier of the beam) for a limited time. Since only this information needs to be provided from the mobile device to the network or between network nodes, the additional load on the air interface is also limited.

In an example, the beam related information is based on or comprises one or more of:
   a beam identifier;
   an identifier of a beam-specific cell individual offset;
   an index of a synchronization signal block; and
   an index of a channel state information reference signal.

A beam identifier may be understood as any information which is able to identify the beam, which the mobile device was using at the time the time-to-trigger procedure was initiated, in particular even though the mobile device has switched the beam in the meantime in particular while the time-to-trigger procedure was still running. The beam related information may alone or together with further information (e.g. a cell identifier or a time stamp) allow or assist in identifying the beam. A beam identifier may for instance only have a size of in the order of bits. For instance, a beam identifier may be (at least temporarily) be unique (e.g. with respect to the network or the cell). A beam identifier may in particular be realized as an identifier of an (in particular beam-specific) cell individual offset (CIO). Generally, the cell-individual offset only applies to one or some of the beams of a respective cell. However, the cell individual offset may also apply to all beams of a cell.

In a preferred example, the beam related information is based on or comprises an index of a synchronization signal block (also referred to as SSB). For instance, in New Radio, a cell can send out up to 64 different SSBs, each for instance using a different beam of a different width and/or direction. Additionally or alternatively, the beam related information is based on or comprises an index of a channel state information reference signal (also referred to as CSI-RS). In addition to SSBs, a cell can send out separate CSI-RSs, where a single CSI-RS is allocated to a single user, or to multiple users which may be in a similar spatial direction. CSI-RS may use the same set of beams as CSI-RS, or a different set of beams, e.g. CSI-RS may use a finer spatial granularity, i.e. smaller beam widths. The CSI-RS may provide PDCCH and/or PDSCH, for instance. The SSB may be quasi co-located (QCL) with the CSI-RS, which can be understood as, simply speaking, the respective signals having gone through very similar conditions, such that detection of one signal can facilitate detecting the respective other signal.

In a preferred example, the stored beam related information is provided to the network as part of one or more of:
   a measurement report;
   a re-establishment request;
   a radio link failure report;
   a successful handover report.

The stored beam related information may in particular be provided to one or more of:
   the serving cell;
   the neighboring cell used as a target cell for a handover; and
   a third cell of the network.

A measurement report comprising the beam related information may in particular be provided from the mobile device of the first aspect to the RAN node of the second aspect (e.g. from the UE to the source or serving cell). A re-establishment request may in particular be provided from the mobile device of the first aspect to the RAN node of the second aspect (e.g. from the UE to the serving cell, the neighboring cell and/or a third cell (i.e. a cell which is neither the serving cell nor the neighboring cell of the handover)), e.g. depending on where the mobile device tries to re-establish the respective connection. A successful handover report may in particular be provided from the mobile device of the first aspect to the RAN node of the second aspect (e.g. from the UE to the neighboring cell). A radio link failure (also referred to as RLF) report may be provided from the mobile device of the first aspect to the RAN node of the second aspect (e.g. from the UE to the serving cell, the neighboring cell or a third cell), e.g. depending on where the radio link has failed and where the mobile device tries to re-establishes a radio link in order to send a respective radio link failure report.

Generally, that information (such as the beam related information) is provided to a cell of the network (such as the serving cell, the neighboring cell or any third cell) is understood to mean that the information is provided to the network entity, e.g. such as to a base station or a part thereof, operating the respective cell (or at least taking part in generating or creating the respective cell).

Since only the beam related information, such as an identifier, needs to be added to the respective request or report, the additional load on the air interface between the mobile device and the network can be kept very limited, when the beam related information is provided to the network.

In an example, the stored beam related information is provided to the network during or after the time-to-trigger procedure. Generally, as soon as the time-to-trigger procedure is initiated the respective beam used at that time and thus the corresponding beam related information can be identified and stored (or may already be stored due to other reasons). In one example, the beam related information may be provided to the network during the time-to trigger procedure, e.g. while the timer of the time-to-trigger procedure is still running. In another example, the beam related information may be provided to the network after the time-to trigger procedure or active, e.g. after the timer of the time-to-trigger procedure has expired. In one example, the beam related information may be sent to the network hours (e.g. up to 24, 48 or even more hours, for instance) later.

In one example, the method further comprises:

switching to a new beam during the time-to-trigger procedure.

More specifically, the switching of the beam may happen after initiating or causing initiating the time-to-trigger procedure for the handover, but before the handover itself. The beam may be switched from a first beam (the beam which was used when the time to trigger procedure was initiated) to a second beam of the serving cell. However, the beam may also be switched again (to a third beam) thereafter. A reason for a switch of a beam may in particular be that the mobile device has moved within the serving cell to a location which is covered or better covered by a different beam. In particular in case many beams are used for the cell (which may be up to16, 32, 64 or even more beams per cell) a switch of the beam during the time-to-trigger procedure (which may be as long as 100 ms or even longer) happens quite regularly and are not an exception anymore. In case the beam is switched during the time-to-trigger procedure (e.g. while the timer of the time-to-trigger procedure is still running), the described approach has the advantage that the information related to the beam, which was used by the mobile device at the time of initiating the time-to-trigger procedure. In contrast to known approaches, which only store information about last connected cell or beam, which is, however, not necessarily (and when a beam switch has taken place certainly not) the same beam as the beam when the time-to-trigger procedure was started.

In an example, the method further comprises:

receiving a handover command for a handover from the serving cell to the neighboring cell used as a target cell.

The handover command may be provided from the serving cell to the mobile device due to a measurement report (which may comprise the beam related information described above) sent from the mobile device to the serving cell. However, as described above, when the actual handover from the serving cell to the target cell is actually executed, the mobile device may have switched (once or even multiple times) the beam in the serving cell compared to the beam, which was used when the time-to-trigger procedure was initiated. Since the stored beam related information is provided to the network (e.g. by means of the measurement report), the network can use the obtained beam related information, when optimizing a parameter of the relevant beam (i.e. the beam used when the time-to-trigger procedure was started) related to handover procedures. As a result, the network can effectively avoid problems for future handovers.

In an example, the method further comprises:

deleting the stored beam related information or allowing the stored beam related information to be deleted, if one or more of a predetermined time has passed;

an acknowledgment for a measuring report, the measuring report comprising the stored beam related information, is received;

a handover command is received;

the time-to-trigger procedure is stopped; and a further time-to-trigger procedure is initiated.

The stored beam related information may be deleted or allowed to be deleted if a predetermined time (e.g. after the information has been stored or after the timer of the time-to-trigger procedure has expired) has passed. For this, a (further) timer may be started and the information may be deleted or allowed to be deleted if the timer has expired. The stored beam related information may also be deleted or allowed to be deleted if an acknowledgment for a measuring report, the measuring report (e.g. sent by the mobile device to the network) comprising the stored beam related information, is received. The stored beam related information may also be deleted or allowed to be deleted if a handover command is received. In these two cases, the mobile device can assume that the beam related information was received by the network. The stored beam related information may also be deleted or allowed to be deleted if the time-to-trigger procedure is stopped (e.g. when the timer of the time-to-trigger procedure expires and, depending on the result of the evaluation of the measurement event condition, the measurement event is triggered or cancelled) and/or if a further time-to-trigger procedure is initiated. In either of these two cases, the mobile device may assume that the handover procedure was cancelled and that the previously stored beam related information will not be needed anymore. Only one, some or all of the above conditions may be applied and the beam related information may be deleted or allowed to be deleted e.g. if a single one of the respective conditions is fulfilled. Furthermore, it is also conceivable that combinations of the above conditions may be applied, e.g. the beam related information may only be deleted or allowed to be deleted if multiple conditions are fulfilled.

In an example, the beam related information is obtained as part of one or more of:

a measurement report;

a re-establishment request;

a handover request;

a handover report;

a radio link failure report;

a radio link failure indication; and a successful handover report.

The stored beam related information may in particular be obtained from one or more of:

the mobile device;

the serving cell;

the neighboring cell used as a target cell for a handover; and a third cell.

As explained above, a measurement report, a re-establishment request, a radio-link failure report and a successful handover report (each comprising the beam related information) may each be obtained from the mobile device. A handover request (comprising the beam related information) may in particular be obtained at the neighboring cell from the serving cell. A handover report (comprising the beam related information) may in particular be obtained at the serving cell from the neighboring cell. A radio link failure indication (comprising the beam related information) may in particular be obtained from the serving cell, the neighboring cell or a third cell, e.g. depending on where the radio link has failed and where the mobile device tries to re-establishes a radio link.

In an example, the method further comprises:

adding the obtained beam related information to a UE history.

The UE history may be the UE history stored in the RAN node, such as a RAN node of the serving cell. Apart from the obtained beam related information, the UE history may further comprise the last visited cells (e.g. the respective cell IDs) and the corresponding time of stay of a respective UE or mobile device. By additionally adding the beam related information allows the beam related information to be utilized by a serving cell, even after a successful handover of the UE to a neighboring cell, which normally causes the serving cell to delete any further UE context information of the UE handed over.

It is to be understood that the presentation of the embodiments disclosed herein is merely by way of examples and non-limiting.

Other features of the present disclosure will become apparent from the following detailed description considered in conjunction with the accompanying drawings. It is to be understood, however, that the drawings are designed solely for purposes of illustration and not as a definition of the limits of the present disclosure, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 7 shows a flow diagram illustrating a further exemplary embodiment of the present disclosure;

FIG. 11 shows a flow diagram illustrating a further exemplary embodiment of the present disclosure;

DETAILED DESCRIPTION OF THE FIGURES

The following description serves to deepen the understanding of the present disclosure and shall be understood to complement and be read together with the description of example embodiments of the present disclosure as provided in the above SUMMARY section of this specification.

The present disclosure addresses mobility scenarios in a cellular and mobile communication network. The Mobility Robustness Optimization (MRO) is a method to optimize mobility parameters in order to minimize failures, unnecessary handovers etc. In conventional networks, MRO may for instance optimize the "cell-individual offset" (CIO) which is one of the main mobility parameters controlling the handover. A serving cell configures different CIOs for different neighbours in the cell, i.e. the network can control the handover separately for every cell pair.

Figure 1:
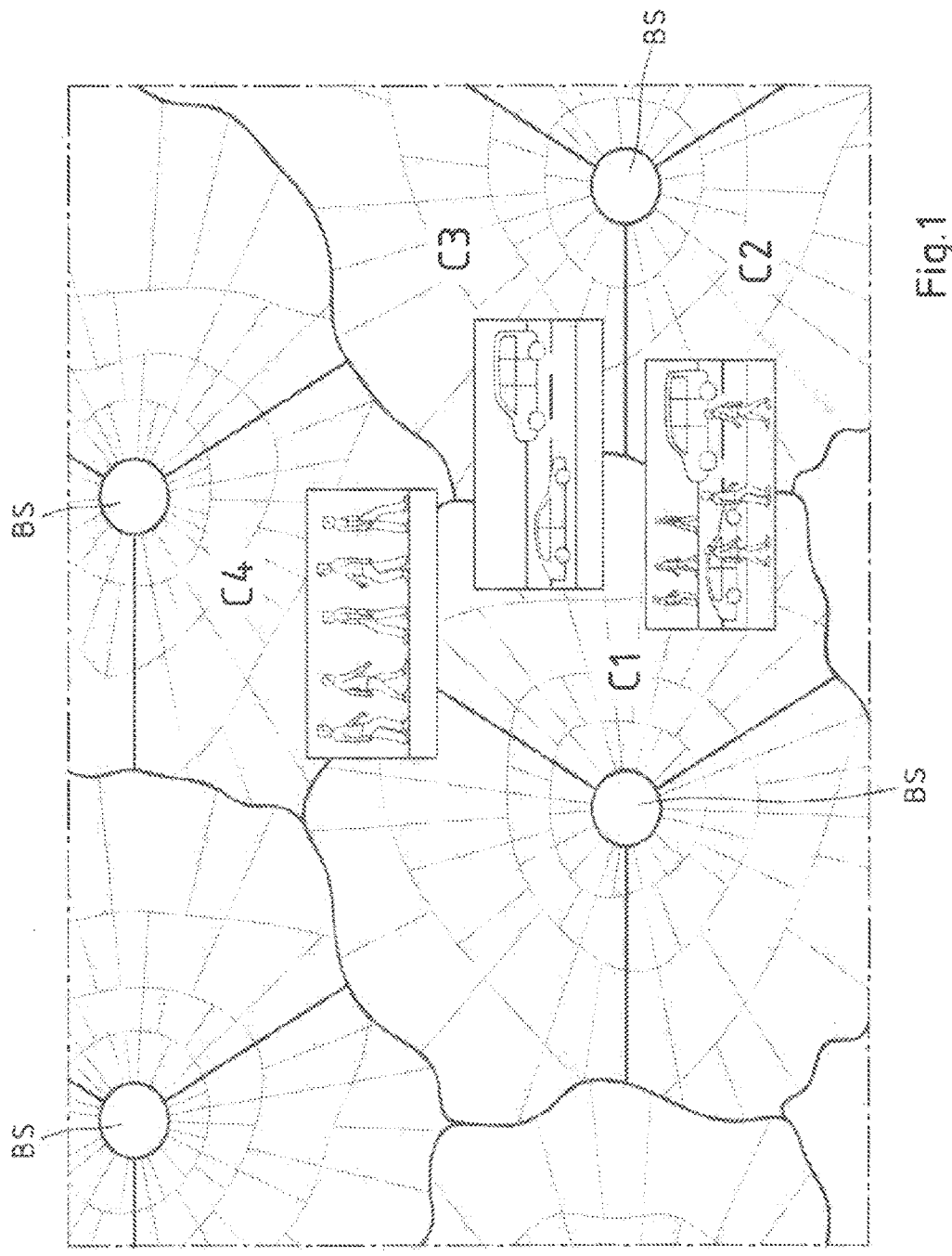
FIG. 1 shows an exemplary mobility scenario with slow and fast moving UEs crossing cell borders, in which exemplary embodiments of the present disclosure can be implemented.

An example is given in FIG. 1. It shows a cellular network comprising base stations BS and different cells C1, C2, C3 and C4. Cell C1 has several neighbours, e.g. cell C2, cell C3 and ell C4. The boundary between cell C1 and cell C3 may be dominated by fast cars moving on a street. The boundary between the same cell C1 and a different neighbour cell C4 may be dominated by a park-like area with pedestrian or even static users.

With conventional MRO, the network collects statistics for every cell boundary. For instance, the boundary C1→C3 may show failures due to "too late handovers" caused by the fast users on the street, whereas the boundary C1→C4 may show "too early handovers" or ping-pongs caused by the slow or static pedestrians. Using the CIO, the network can react by configuring a large CIO (e.g. +4 dB) on the street dominated boundary C1→C3, since this would upgrade the cell measurements of cell C3, thereby causing early handovers avoiding RLFs. Equivalently, the network configures a low CIO (e.g.-ldB) in the pedestrian-dominated boundary C1→C4, since this would downgrade the measurements of cell C4, thereby causing late handovers avoiding ping-pongs.

Instead of the CIO, the network may also configure different time-to-trigger (TTT) parameters for different neighbours. In this regard, a so called "alternative TTT" may be used. Such an alternative TTT is configured along with a list of neighbour cell IDs, so that the UE will apply the alternative TTT when the entry condition is triggered by one member of the list. The original sense was to configure a shorter TTT for small cell neighbours. In principle, this can also be applied in a similar way as the CIO. An alternative, shorter TTT can be configured for those neighbours with high speed boundaries, e.g. the cell C1 would configure a shorter TTT (e.g. 40 ms instead of the default of e.g. 100 ms) for neighbour cell C3. Automatic optimization can follow the same MRO principles as described above for the CIO.

In New Radio (NR), the use of beamforming methods becomes essential, in particular due to a spectrum at larger frequencies where more severe propagation conditions have to be compensated by beamforming gain. The different sections within a cell in FIG. 1 illustrate the area defined by different beams. In the following we will show how beamforming could be used to improve MRO performance.

A much more elegant solution is to perform a beam-specific optimization. From the figure, we observe that the beams increase the spatial resolution from cell (pair) level to beam (pair) level. The street on the boundary C1→C2 is originated in one beam, and the park-like pedestrian area cover other beams. This seems to be a much more natural grouping than the velocity. Hence, the network may Set up beam-specific handover statistics;

Optimize different CIO for different beam (pair) s;

Configure different CIOs depending on the beams that the UE is moving in.

This allows beam-specific MRO in a sense that the network creates beam specific key performance indicators and derives beam specific CIOs. The UE is not involved in this invention. This implies that the network has to reconfigure the UE with a new CIO whenever the UE is switched to a new beam. Furthermore, the network has to make its evaluation with existing information.

However, in some situations, MRO can make bad decision when based on existing information. Assume the following scenario where the beam is switched while the TTT procedure is running:

The UE is connected to cell A/beam 1 and uses Ocn1.

The entry condition of a measurement reporting event (e.g. A3) is fulfilled and TTT procedure is started.

While TTT procedure is running, the UE is switched to beam 2 and selects a new Ocn2.

In this situation different problems can arise:

1. The TTT timer expires, a measurement report is sent, and a handover to cell B is initiated and successfully executed.
   a. However, the UE is handed over back to the original cell A shortly after the handover to cell B (usually called a "ping-pong").
   b. However, the UE suffers an RLF in cell B shortly after the handover to cell B (usually called "too early handover" or "handover to wrong cell", depending on whether the UE will re-establish in the original cell A or in a new (third) cell C).
2. The TTT timer expires, a measurement report is sent, and a handover to cell B is initiated, but fails (so called Handover Failure).
3. A Radio Link Failure happens before the handover is initiated. This may happen wither before the TTT timer expires, or when the measurement report is not received by cell A, or when the handover command is not received by the UE. This is typically called "too late handover".

MRO procedures are designed to identify that cell A has done a bad handover decision, and to enable cell A to correct optimize the parameters for the decision for future handovers. To this end, several messages via X2 interface are supported, e.g. an RLF indication and or a handover report.

When extending the concept of MRO to be beam-specific, it is desirable to identify, which of the beam specific CIOs has to be changed, i.e. which is the "guilty" beam the parameter settings of which should be corrected.

In the scenario illustrated above, it is unclear whether beam 1 or beam 2 is the "guilty" one, i.e. whether the CIO of beam 1 (connected beam when the TTT procedure was started) or of beam 2 (connected beam when measurement report is sent) should be corrected. We can already observe that changing the offset of beam 2 definitely cannot make the handover earlier, only a parameter change of beam 1 can effect that. It is also difficult to make the handover later by changing the offset of beam 2. When switching to beam 2, the TTT procedure is already running, so the TTT procedure can only be stopped when already connected via beam 2 and restarted later on which may cause a rather significant postponing of the handover. We can conclude, that beam 1 should actually be changed on all the cases sketched above.

From simulations, it was derived that beam switches during the TTT procedure happen more often than expected, i.e. this is not a corner case. Especially, if many beams are used (e.g. 64 beams in Frequency Range 2), moving UEs will not stay long in a single beam. And if the time stayed in a single beam approaches a similar order of magnitude as the timer of the TTT procedure, the probability of such an event increases.

Today's approaches do not provide a solution to this problem.

The RRC re-establishment request contains mainly the last connected cell (PCI), the UE identifier in the last connected cell (C-RNT), and the re-establishment cause (e.g. RLF). Extending the request with beam information, however, would result in information with respect to the last connected beam. In case of a handover failure, this can even be different from beam 2 (new serving beam while the TTT procedure is running), since the UE may switch the beam again after the measurement report was sent to the source cell of the handover and before executing the random access to the target cell.

The RLF report contains information about the situation at the time when the failure happens and can thus only comprise information about beam 2, and not beam 1.

The UE history, which is stored by the cells and which comprises the last visited cells with a dwell time (time of stay), can be forwarded during a handover. Even if the UE history information is extended with beam information, the network would only able to identify the last beam before a handover, which again can be even different from beam 2 (since the beam could be changed again between sending out the measurement report and receiving the handover command).

It may be possible in some cases that the network makes a rough approximation of the beam at the time of starting the TTT procedure: For instance, assuming that the serving cell receives a measurement report, the serving cell knows/or may remember when the beam has been switched, and it knows the duration of the TTT interval, so it may determine the beam at the time of starting the TTT procedure. However, this suffers quite some uncertainty, since the network does not know how long the UE processing was until measurement report was finally sent, it does not know how long it took to send the measurement report (retransmissions), etc. So, this will now be very accurate. Even worse, such an approximation may be impossible for some other cases, e.g. RLF, where cell selection and RACH introduce additional sources of significant inaccuracy.

We can conclude that these approaches may not allow any beam resolution. If extended, they allow to determine the beam at the expiry of the TTT timer (or even a later beam), but not the beam at the time of starting the TTT procedure. Vendor-specific approximations in the network may be very inaccurate.

It is thus desirable to have a method which allows the network to determine the beam at the time of starting the TTT procedure, without increasing the complexity too much.

In the following the overall environment, in which embodiments of the present disclosure may be implemented, is first described with reference to FIGS. 2, 3 and 4.

Figure 2:
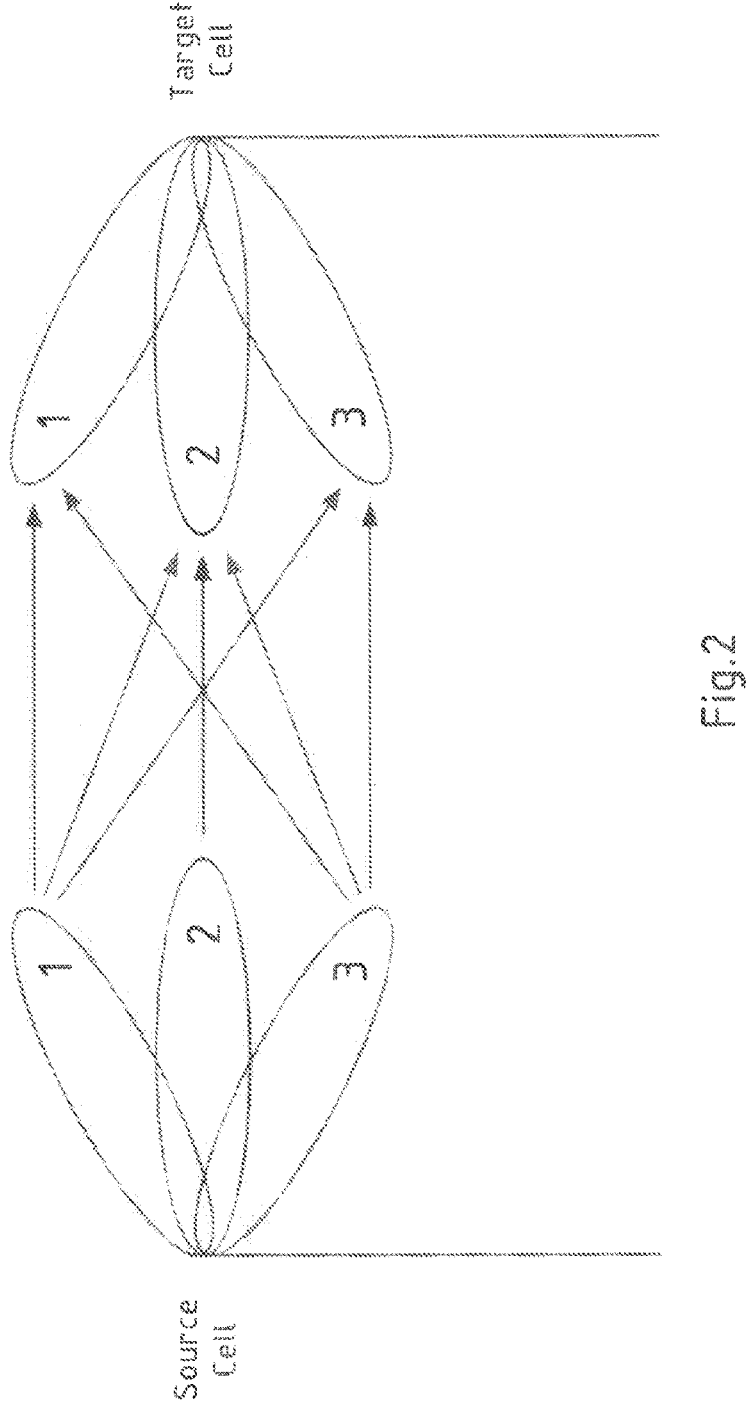
FIG. 2 shows a diagram illustrating a beam based mobility scenario where exemplary embodiments of the present disclosure are implementable.

FIG. 2 shows a diagram illustrating a beam based mobility scenario where examples of embodiments are implementable. As indicated in FIG. 2, it is assumed that a cell (in FIG. 2, a source cell as a cell currently serving a UE, and a target cell to which handover procedure of a UE is executed are shown, wherein the number of cells indicated in FIG. 2 is merely a simplified example for illustrative purposes) comprises a plurality (or at least one) of beams 1, 2 and 3, each of which may have similar or different properties, wherein the coverage areas of the respective beams may be overlapping or separate from each other. When a UE (not shown in FIG. 2) is moving e.g. from the source cell towards the target cell and a handover condition is fulfilled (e.g. one or more thresholds for connection quality to the source/target cell are met), a time-to-trigger procedure may be started and if the respective condition is still fulfilled at the end of the TTT, the connection is not only switched from the source cell to the target cell, but also from one or more of the (currently serving) beam(s) in the source cell to one or more of the beams in the target cell (indicated by arrows directed to the respective beams 1 to 3 of the target cell). That is, a UE is served by a specific beam at each moment of time. According to examples of communication systems, beam mobility within a cell is handled by specific layers of a protocol stack. For example, beam mobility is handled in lower layers, such as at Physical and MAC sublayer, and is transparent for higher layers. For example, in current cellular communication systems based on 3GPP standards, when beam operations are used, the handover is triggered at Layer 3 by using cell quality measurements of the source and target cell. Nevertheless, the UE is served by one beam in the source cell and after the handover will be served by one beam in the target cell.

5G introduces the New Radio technology and also an architecture for which the different sublayers of the RAN may be split into two logical entities in a communication network control element (like a BS or gNB), which are referred to as distributed unit (DU) and central unit (CU). For example, the CU is a logical node that controls the operation of one or more DUs over a front-haul interface (referred to as FI interface). The DU is a logical node including a subset of the gNB functions, depending on the functional split option. Since the management of beams is handled at physical and MAC layer, higher layers like layer 3 (network layer) may not have information regarding which beam is currently used for the UE (i.e. which beam serves the UE). For example, in case of the split configuration of CU/DU indicated above, the CU has no information about which beam is currently used to serve the UE.

This may have some impact on how a handover is performed/prepared, which may have an impact on the mobility optimization. In the following, different exemplifying embodiments will be described using, as an example of a communication network to which examples of embodiments may be applied, a communication network architecture based on 3GPP standards for 5G communication networks, without restricting the embodiments to such architectures, however. It is obvious for a person skilled in the art that the embodiments may also be applied to other kinds of communication networks having suitable means by adjusting parameters and procedures appropriately, e.g. 4G networks, Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc., Furthermore, without loss of generality, the description of some examples of embodiments is related to a mobile communication network, but principles of the invention can be extended and applied to any other type of communication network, such as a wired communication network.

Figure 3:
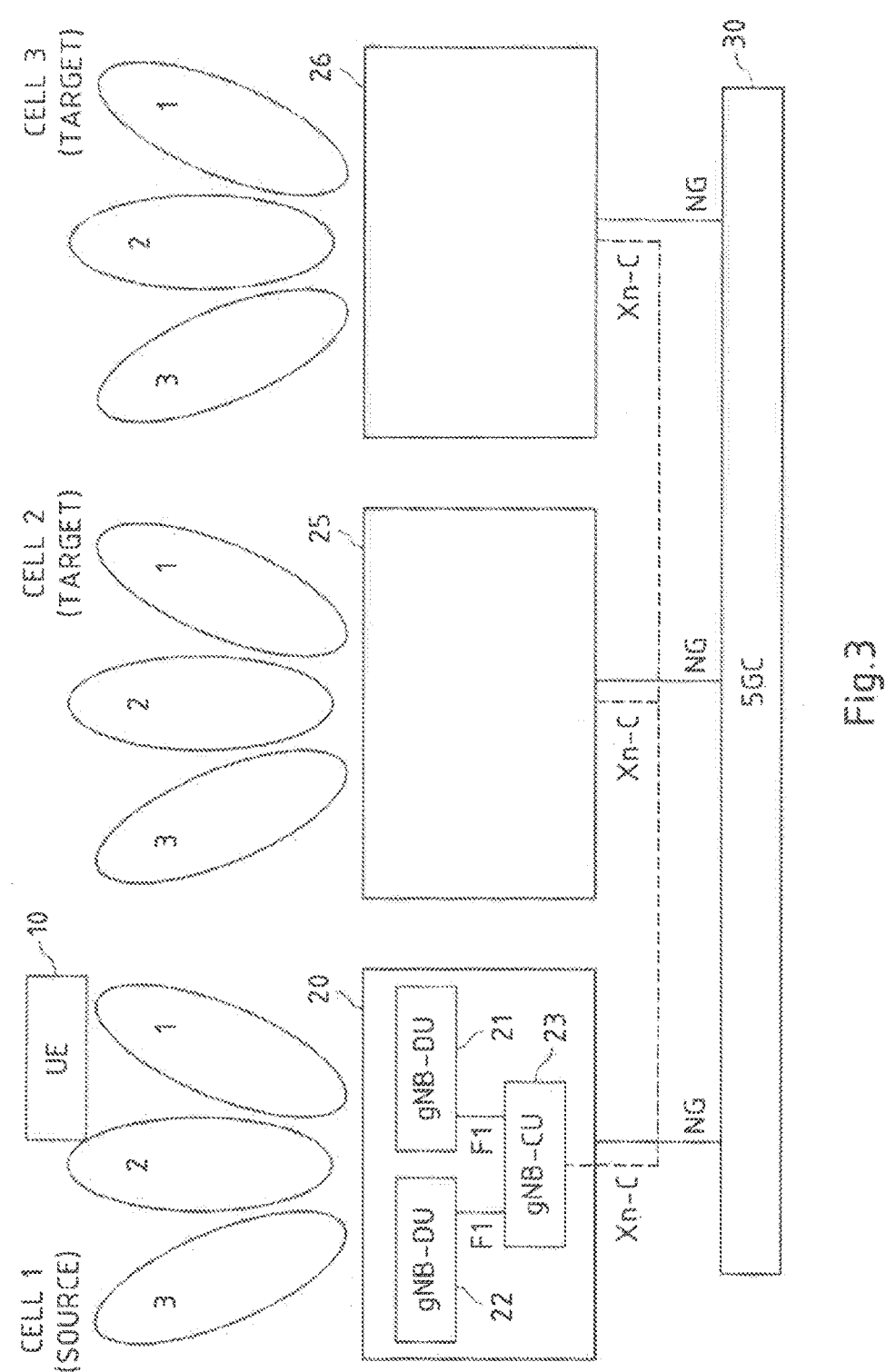
FIG. 3 shows a diagram of an exemplary communication network where exemplary embodiments of the present disclosure are implementable.

As shown in FIG. 3, a communication element such as a user equipment (UE) 10 is connected to a cell 1, i.e. the base station or such as a gNB 20, via a communication beam of the cell 1 (e.g. beam 1 of the beams 1 to 3 of cell 1). In the example shown in FIG. 2, the gNB 20 is provided with a CU 23 and two DUs 21 and 22 being connected to the CU 23 by a FI interface.

Furthermore, as shown in the example of FIG. 3, there is a plurality of further cells (in FIG. 2, for illustrative purposes, two cells, i.e. cell 2 and cell 3 are shown) to which the UE 10 can connect, e.g. by executing a handover procedure. That is, cells 2 and 3 may be target cells for a handover while cell 1 is currently serving the UE 10 would be the source cell for a respective handover procedure. Similarly to cell 1, cells

2 and 3 are controlled by gNB 25 and 26, respectively, and each provides a plurality of beams 1 to 3.

As shown in FIG. 3, each gNB of the cells is connected to a core network, such as a 5GC, via respective interfaces, indicated as NG interfaces. Furthermore, each gNB of the cells is connected with each other by means of a specific interface, which is referred to e.g. as an Xn-C interface.

Generally, when conducting a handover for UE 10 in a communication network environment such as that shown in FIG. 3, the UE 10 sends, for example, an event based measurement report to gNB of the cell to which the UE 10 is currently connected, i.e. the serving gNB 20 which controls the source cell 1. For example, the report includes information related to the cell quality, beam measurement results, and/or beam IDs of communication beams in the source and target cells which are receivable (i.e. measurable) by the UE 10.

For optimizing the quality of handover processes, different additional features are considered. One of these features is the so-called mobility robustness optimization (MRO). MRO is a feature of a self-organized network (SON) for automatic detection and correction of errors in the mobility configuration allowing optimizing the quality of handover process. For example, the CIO between two cells can be modified to cope with the problem of too early or too late handover. Late handover means that the UE does not receive the handover command, e.g. due to weak signal, e.g. since the UE is moving faster than the handover parameter settings allow. The handover command does not reach the UE (already located in the target cell) so that connection is lost. By using information from the target cell, handover parameters can be adjusted. On the other hand, handover too early means that the signal strength in the target cell is too weak, and the connection is lost almost immediately.

Figure 4:
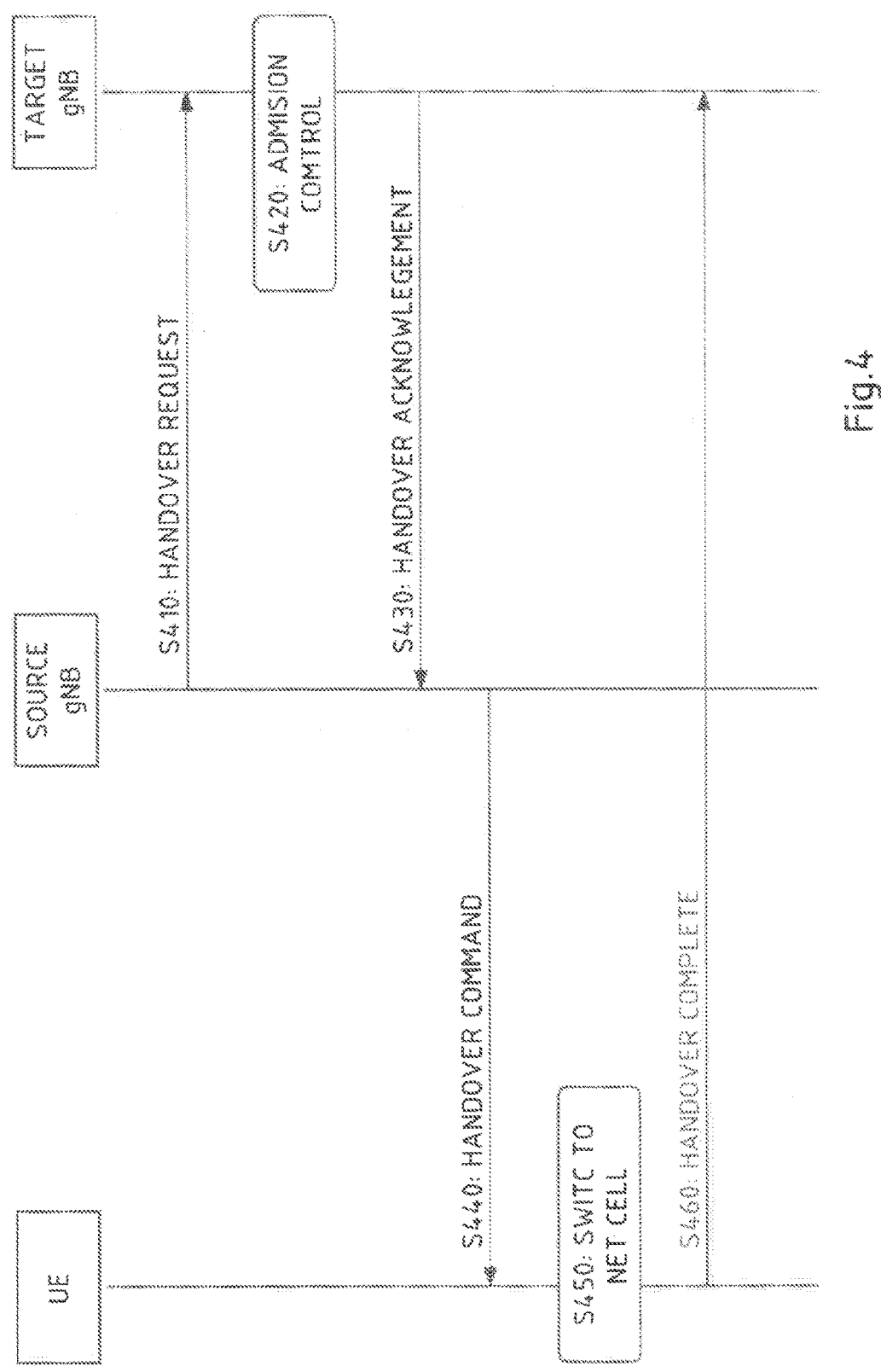
FIG. 4 shows a signaling diagram illustrating an exemplary handover processing, which is applicable to exemplary embodiments of the present disclosure.

FIG. 4 shows a signaling diagram illustrating a processing for a handover processing where examples of embodiments are applicable. In detail, FIG. 4 shows a signaling message flow in case of a 5G based system (e.g. like that shown in FIG. 3) where a an inter-gNB handover is conducted. The processing described in connection with FIG. 4 represents one possible starting point for procedures related to a handover control according to examples of embodiments. In S410, the source gNB initiates a handover and issues a handover Request over the Xn interface to the target gNB. In S420, the target gNB performs admission control. Then, in S430, the target gNB provides RRC configuration as part of a handover acknowledgement message. In S440, the source gNB sends a handover command to the UE in which it provides the RRC configuration. The handover command message includes at least cell ID and all information required to access the target cell so that the UE can access the target cell without reading system information. The access information to the target cell may include beam specific information. In S450, the UE moves the RRC connection to the target gNB. Then, in S460, the UE replies the handover complete message.

Figure 5:
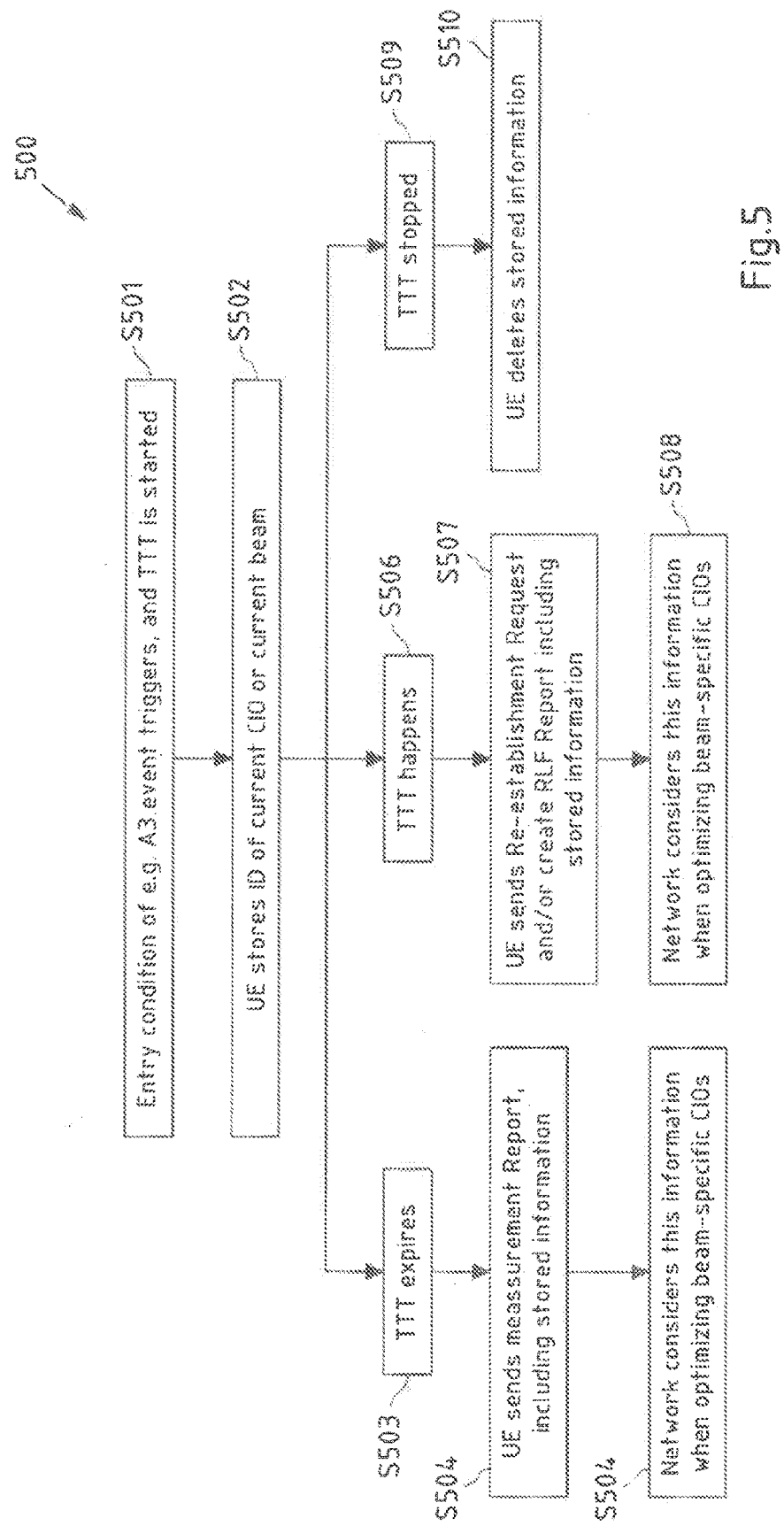
FIG. 5 shows a flow diagram illustrating exemplary embodiments of the present disclosure.

FIG. 5 illustrates a flow diagram 500 illustrating exemplary embodiments of the present disclosure for 3 different cases.

In S501, the entry condition of e.g. the A3 event is fulfilled, and the TTT procedure is started. In S502, the UE stores the ID of the current beam specific CIO or the ID of the current beam. According to the present disclosure it has been realized that the UE is able determine the actual beam, which is used at the time when the TTT procedure is started, and that the UE can log this information. Therefore, the UE logs or stores this beam related information, e.g. when the TTT procedure is stared or at least when the UE changes the CIO or the beam while the TTT procedure is running, so that the logged or stored information comprises information about the beam used when the TTT procedure was started, e.g. at least an identifier of the CIO or the beam before the changing.

In case the timer of the TTT procedure expires, S503, the UE will send a measurement report to the network including the stored information, S504. The network may then use this information to optimize the beam-specific CIOs, S505.

In case an RLF happens before the TTT timer expires, S506, the UE sends an RRC re-establishment request and/or creates an RLF Report (the RLF Report may be sent out immediately, or up to 48 hours later) to the network, S507. Again, the network may use this information to optimize the beam specific CIOs, S508.

In case the TTT timer is stopped (e.g. since the entry condition is no longer fulfilled), S509, the information stored by the UE may be deleted, S510.

As partly already illustrated above and as will be explained in more detail below, the UE may send the logged/stored beam related information to the network in different ways, e.g. in one or more of

- a measurement report, which may be triggered when the TTT timer expires (see S504, for instance);
- a re-establishment request in case an RLF happens before the TTT timer expires, or in case a handover failure happens (see S507, for instance);
- in an RLF report in case an RLF happens before the TTT timer expires, or in case a handover failure happens (see S507, for instance); and/or
- in a report sent after a successful handover (such a successful handover report is currently under discussion, but it is not specified yet).

The beam related information may in particular be a beam ID, which may in particular correspond to the index of the SSB or CSI-RS providing PDCCH and/or PDSCH, or to the SSB index that is Quasi co-located (QCL) with the CSI-RS providing PDCCH and/or PDSCH.

In the following, it will be illustrated in more detail how the network can solve each of the problems 1a, 1b, 2 and 3 outlined above.

Figure 6:
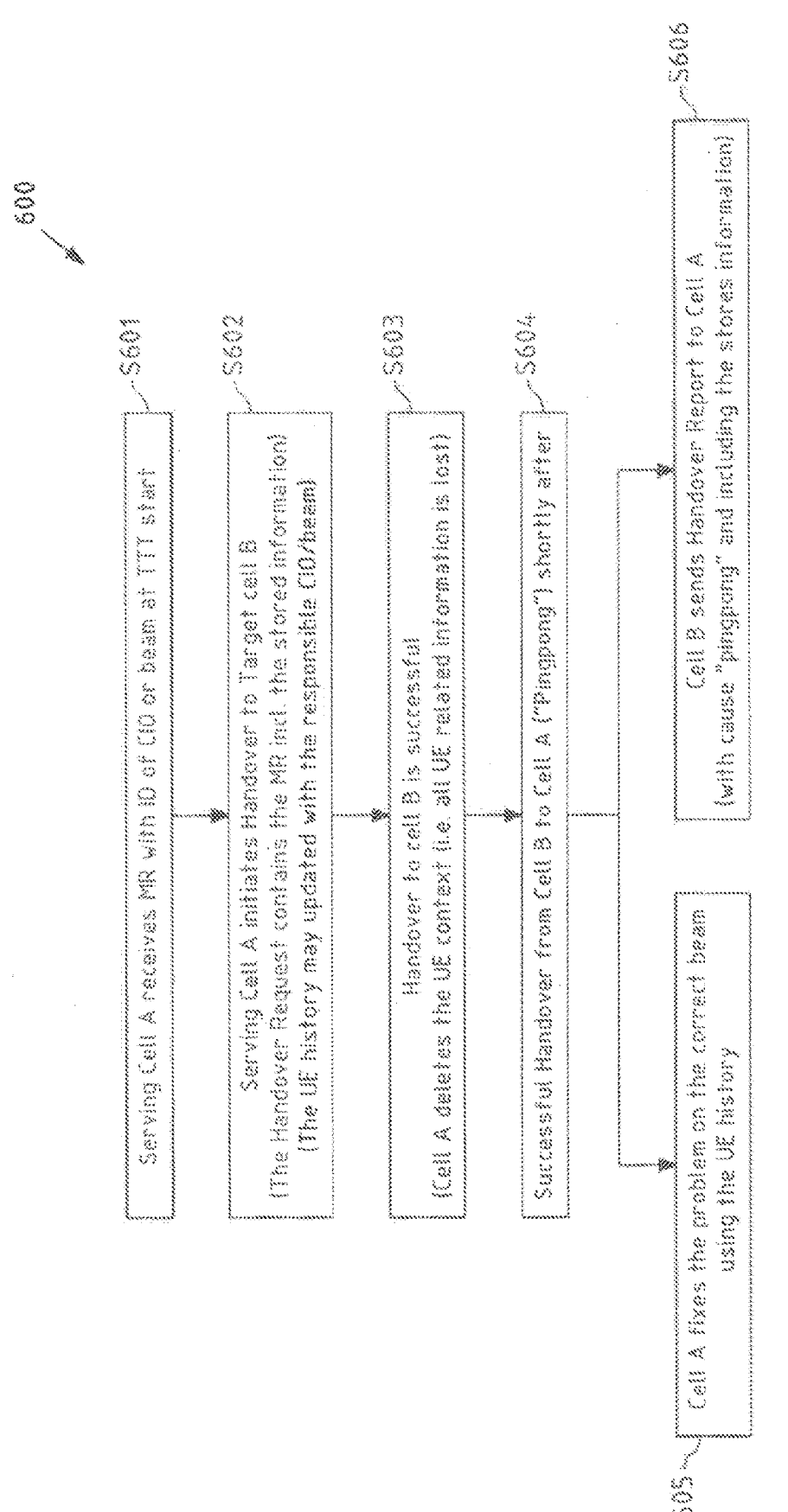
FIG. 6 shows a flow diagram illustrating a further exemplary embodiment of the present disclosure.

FIG. 6 shows a flow diagram 600 illustrating a further exemplary embodiment of the present disclosure. This embodiment in particular deals with the above problem 1a of a ping-pong handover.

The source or serving cell A (such as source cell of FIG. 2 or cell 1 of FIG. 3) receives a measurement report comprising the beam related information previously stored at the UE (such as the ID of the CIO or of the beam used by the UE at the time of starting the TTT procedure), S601.

The source or serving cell initiates a handover to target cell B (such as target cell of FIG. 2 or cell 2 or 3 of FIG. 3), S602. The handover request message (e.g. a message via X2) contains the stored beam related information e.g. the measurement report with the beam related information. Additionally or alternatively, the UE may also add the stored information to the UE history. Such information is presently not stored in the UE history.

In this scenario, the handover from cell A to cell B succeeds, S603. The source cell A will delete any information regarding the UE handed over. Even if it does not delete it, it will no longer be able to identify the respective UE later on, i.e. all UE related information is lost in the source cell A at this point, as long as the stored information is not added to the UE history.

However, shortly after, another successful handover from cell B back to cell A happens (called a "ping-pong"), S604.

In one embodiment, in S605, cell A can solve the problem on the correct beam of cell A (e.g. by changing the parameters such that the handover is executed later) by using the stored information in the UE history (stored in S602), which is also part of the handover request.

In another embodiment, inS606, cell B may send a handover report message (e.g. via X2) to cell A, which includes the stored information (received at cell B in the previous handover request in S602) and optionally indicating a cause (such as "ping-pong"). This embodiment does not require extending the UE History as above, but it requires an extension of the existing handover report.

Using said obtained beam related information, when optimizing a parameter of the beam related to handover procedures in order to fix or solve the problem may in particular be based on any known and suitable MRO method. For instance, the corresponding beam-specific CIO may be increased or decreased either immediately, or the network may count certain beam-specific key performance indicators (e.g. ping-pong, too late HO, too early HO, wrong cell HO) and may then correct the beam-specific CIO when sufficient statistics are available.

FIG. 7 shows a flow diagram 700 illustrating a further exemplary embodiment of the present disclosure. This embodiment deals in particular with the above problem of a too early handover or wrong cell handover, referred to as problem 1b above.

In S701, the source or serving cell A (such as source cell of FIG. 2 or cell 1 of FIG. 3) receives a measurement report (MR) with the information previously stored at the UE and related to the beam which was used by the UE at the time of initiating the time-to-trigger procedure.

In S702, a successful handover happens from source cell A to target cell B (such as target cell of FIG. 2 or cell 2 or 3 of FIG. 3). Here again, the handover request contains the measuring report and thus the stored beam related information and the source cell A deletes all UE related information (UE context) after the successful handover.

A radio link failure happens shortly after, S703.

In S704, the UE sends an RRC re-establishment request to the original cell A (the case of a too early handover) or to a third cell C (the case of a wrong cell handover). This request may or may not contain the stored beam related information. Furthermore, for the sake of completeness, the UE may also prepare an RLF Report, but this is not relevant in this example.

In S705, either cell A or cell C sends an RLF indication message (e.g. via X2 interface) to cell B. Cell A will not be able to recognize the UE, since it has deleted the whole UE context earlier in S702.

However, cell B still has the UE context (so that it can recognize the UE) including the stored beam related information. In S706, cell B will realize that the UE was only shortly in cell B, so that there was no chance to initiate a proper handover. Therefore, it will identify cell A as having made a wrong handover decision and sends a handover report (e.g. via the X2 interface) to cell A comprising the beam related information and which may indicate a "too early handover" or a "wrong cell handover". While cell A may have deleted the UE context at this point in time, cell A receives the beam related information with the handover report.

In S707, cell A can then use the received beam related information in order to adjust one or more beam parameters related to the handover in order to fix the problem on the correct beam, so that such errors are can be in the future.

Figure 8:
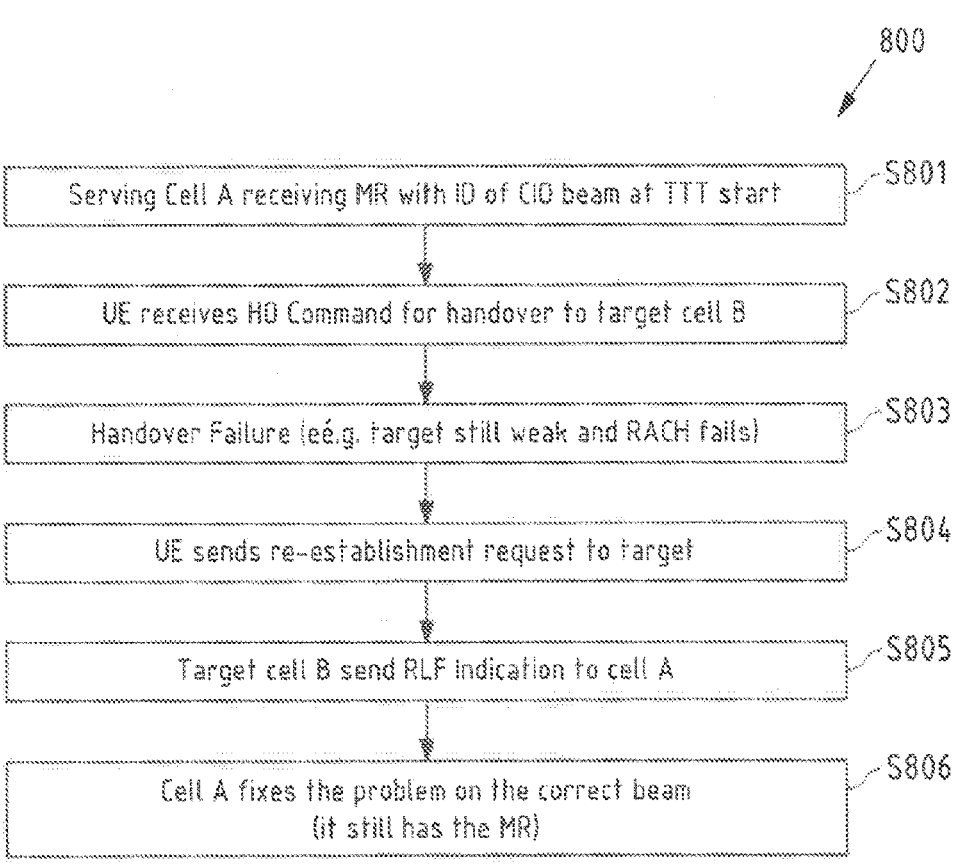
FIG. 8 shows a flow diagram illustrating a further exemplary embodiment of the present disclosure.

FIG. 8 shows a flow diagram 800 illustrating a further exemplary embodiment of the present disclosure and dealing with the problem of a handover failure referred to as problem 2 above.

In S801, the source or serving cell A (such as source cell of FIG. 2 or cell 1 of FIG. 3) receives a measurement report (MR) with the information previously stored at the UE and related to the beam which was used by the UE at the time of initiating the time-to-trigger procedure.

In S802, the UE correctly receives a handover command for a handover to target cell B (such as target cell of FIG. 2 or cell 2 or 3 of FIG. 3).

However, in S803, the handover fails, e.g. because the target cell B is still too weak, and the RACH fails.

In S804, the UE sends an RRC connection re-establishment to the target cell B, with or without the stored beam related information.

In S805, the target cell B sends an RLF indication to cell A (e.g. via X2 interface).

In S806, cell A optimize respective parameters, as it still has the UE context including the stored information from the measurement report.

Figure 9:
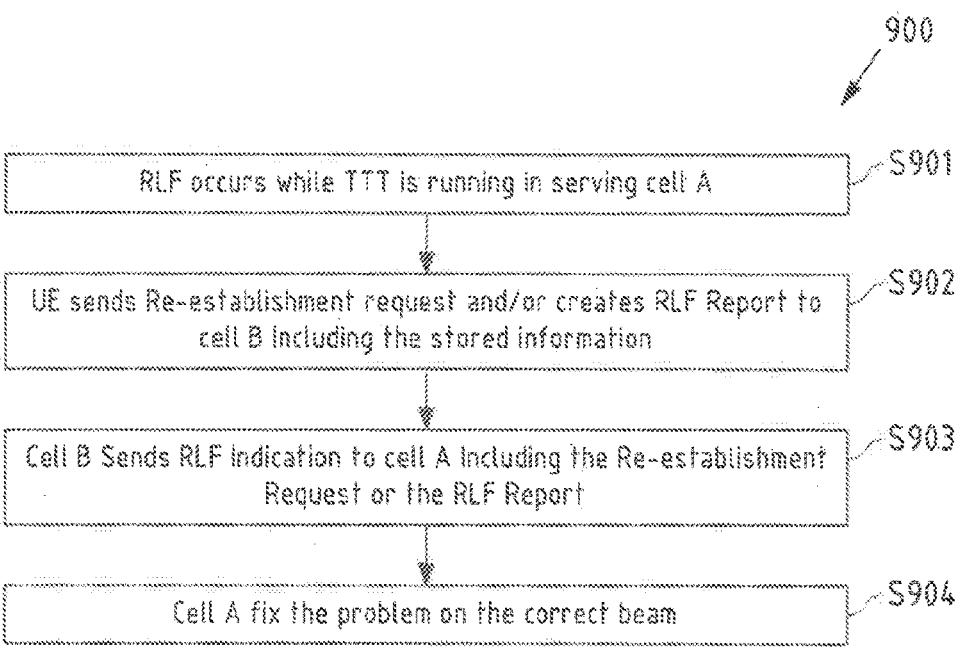
FIG. 9 shows a flow diagram illustrating a further exemplary embodiment of the present disclosure.
Figure 10:
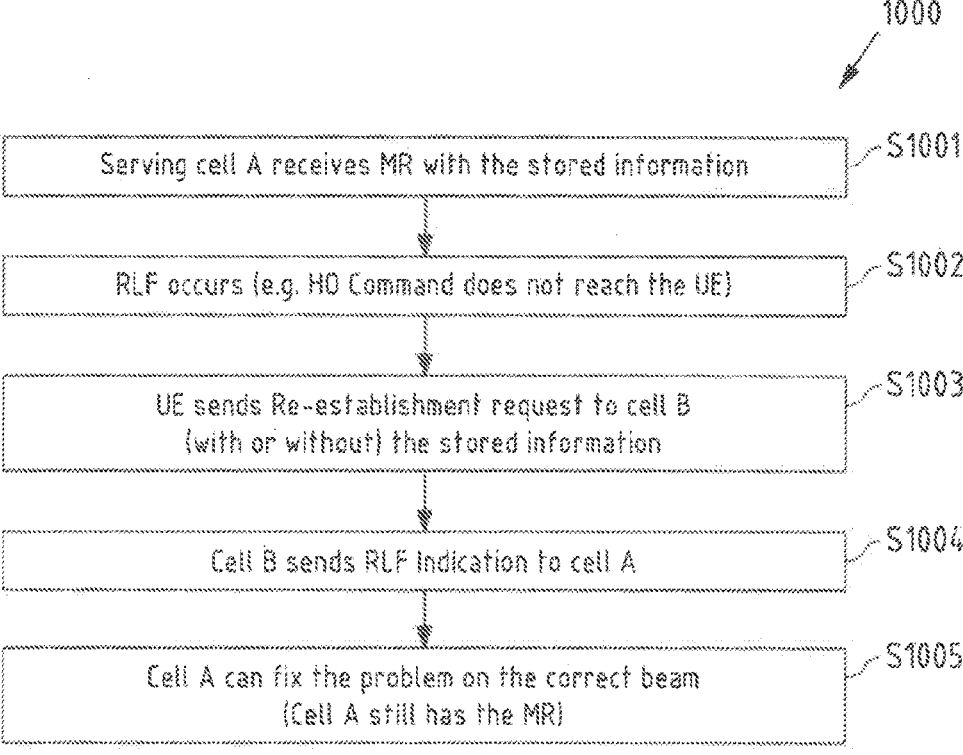
FIG. 10 shows a flow diagram illustrating a further exemplary embodiment of the present disclosure.

FIGS. 9 and 10 now illustrate two examples for the case of a too late handover, referred to as problem 3 above. While FIG. 9 deals with the case where an RLF occurs before the TTT timer has expired, FIG. 10 deals with the case where the RLF occurs after the TTT timer has expired and a measurement report was successfully received by the network.

FIG. 9 shows a flow diagram 900 illustrating a further exemplary embodiment of the present disclosure pertaining to the case of an RLF during the TTT procedure.

In S901, an RLF occurs while the TTT timer is running in serving cell A (such as source cell of FIG. 2 or cell 1 of FIG. 3).

In S902, the UE sends an RRC connection re-establishment request with the beam related information stored at the UE and relating to the beam in use during the start of the TTT timer to cell B (such as target cell of FIG. 2 or cell 2 or 3 of FIG. 3). Alternatively or additionally, the UE may send an RLF report with the beam related information stored at the UE to cell B. This might be sent out immediately or up to 48 hours later.

In S903, cell B sends an RLF indication message to cell A (e.g. via the X2 interface). The RLF indication message contains the beam related information from the re-establishment request or the RLF report.

In S904, cell A can then use the received beam related information (received in the RLF indication) in order to adjust one or more beam parameters related to the handover in order to fix the problem on the correct beam of cell A.

FIG. 10 shows a flow diagram 1000 illustrating a further exemplary embodiment of the present disclosure pertaining to the case of an RLF after the measurement report was received and thus after the TTT timer has expired.

In S1001, the serving cell A (such as source cell of FIG. 2 or cell 1 of FIG. 3) receives a measurement report from the UE with the beam related information stored at the UE and relating to the beam in use during the start of the TTT timer.

In S1002, an RLF occurs, e.g. because the handover command has not reached the UE since the UE is may already be too far away from the serving cell A.

In S1003, the UE sends an RRC connection re-establishment request to cell B (such as target cell of FIG. 2 or cell 2 or 3 of FIG. 3), which may or may not comprise the stored beam related information.

In S1004, cell B sends an RLF indication to cell A.

In S1005, cell A has still the UE context and can then use the received beam related information (received in the measurement report) in order to adjust one or more beam parameters related to the handover in order to fix the problem on the correct beam of cell A.

In another RLF scenario, the TTT timer expires and a measurement report (including the beam related information) is sent out by the UE, but the network may not receive the measurement report, e.g. because of bad uplink radio conditions. In that case an RLF is very likely, and then the question arises how long the UE will keep the stored beam related information. At some point in time, the information gets outdated and should not be stored forever.

While in one embodiment, the UE deletes the stored information when TTT timer expires, this would however not solve the above described scenario where the measurement report is lost. The CIO in the original beam triggered the measurement report too late and the network would then only be aware of the last connected beam, as the measurement was lost and the stored beam related information would not be available anymore when the RLF happens.

Thus, in another embodiment, the UE instead keeps the beam related information after TTT timer expires and only deletes it in at least one of the following cases:

In case another TTT procedure is started (the previously stored beam related information will be overwritten in this case).

In case the measurement report is fully acknowledged (then the UE can make sure that the information is in the network).

In case a predetermined time has passed, e.g. a configurable time period has expired after the TTT procedure (e.g. the UE starts a new timer "Txxx" when the TTT timer expires, and deletes the information when the timer "Txxx" expires. The timer "Txxx" can be stopped when the information is deleted due to any other reason.

In case a handover command is received.

An example of such an embodiment is illustrated in FIG. 11 pertaining to the scenario of a too late handover or an RLF when the MR is not received.

In S1101, the TTT timer expires and the UE sends out a measurement report, but the MR is not received by the serving cell A (such as source cell of FIG. 2 or cell 1 of FIG. 3). Here it would not be relevant whether or not the stored information is included in the MR, as the MR is lost anyway.

IN S1102, the UE now keeps the stored beam related information and starts a timer "Txxx".

However, as mentioned, in another embodiment the UE may also delete the stored beam related information when the TTT timer expires.

In S1103, an RLF occurs while the "Txxx" timer is running, since the MR was lost and the network is not aware that a handover is needed.

In S1104, the UE sends an RRC connection re-establishment request with the beam related information stored at the UE and relating to the beam in use during the start of the TTT timer to cell B (such as target cell of FIG. 2 or cell 2 or 3 of FIG. 3). Alternatively or additionally, the UE may send an RLF report with the beam related information stored at the UE to cell B. This might be sent out immediately or up to 48 hours later.

In S1105, cell B sends an RLF indication message to cell A (e.g. via the X2 interface). The RLF indication message contains the beam related information from the re-establishment request or the RLF report.

In S1106, cell A can then use the received beam related information (received in the RLF indication) in order to adjust one or more beam parameters related to the handover in order to fix the problem on the correct beam of cell A.

In S1107, the UE deletes the stored information e.g. when the "Txxx" timer expires, when an acknowledgement for a measurement report is received, when a handover command is received or when another TTT procedure is started.

The key advantages of the invention can be summarized as follows:

The network can identify the "guilty" beam of a mobility problem. This is not possible with today's methods and logical extensions thereof.

The complexity is limited, the UE only has to store limited information such as an identifier while the TTT timer is running, and it can delete it afterwards.

The overhead on the air interface is limited, since only limited information, such as an identifier is added.

The Overhead on the X2 interface is negligible, since the additional information will be part of transparent containers in many cases (measurement report, RLF report, etc.).

Figure 12:
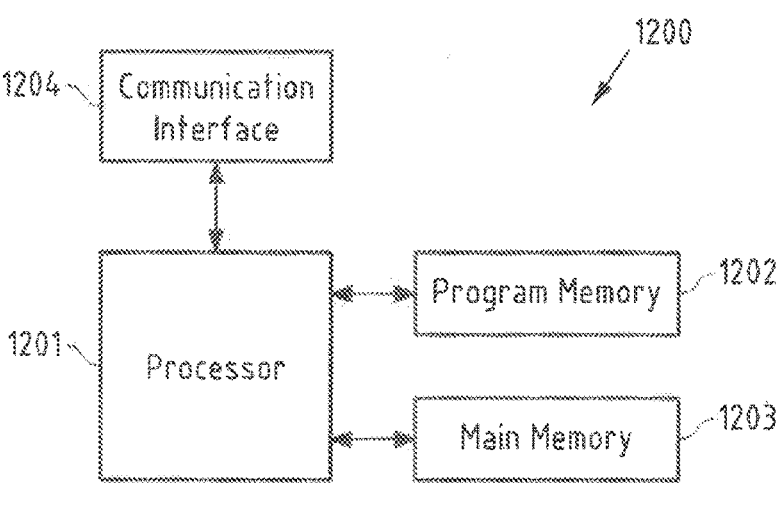
FIG. 12 is a block diagram of an exemplary embodiment of an apparatus according to the present disclosure.

FIG. 12 is a block diagram of an exemplary embodiment of an apparatus according to the present disclosure representing a UE in the form of a mobile device 1200, such as UE 10 of FIG. 3 or FIG. 4.

For example, mobile device 1200 may be one of a smartphone, a tablet computer, a notebook computer, a smart watch, a smart band and an IoT device.

Mobile device 1200 comprises a processor 1201. Processor 1201 may represent a single processor or two or more processors, which are for instance at least partially coupled, for instance via a bus.

Processor 1201 executes a program code stored in program memory 1202 (for instance program code causing mobile device 1200 to perform one or more of the embodiments of a method according to the present disclosure or parts thereof, when executed on processor 1201), and interfaces with a main memory 1203. Program memory 1202 may also contain an operating system for processor 1201. Some or all of memories 1202 and 1203 may also be included into processor 1201.

One of or both of a main memory and a program memory of a processor (e.g. program memory 1202 and main memory 1203) could be fixedly connected to the processor (e.g. processor 1201) or at least partially removable from the processor, for instance in the form of a memory card or stick.

A program memory (e.g. program memory 1202) may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable from, for instance in the form of a removable SD memory card.

A main memory (e.g. main memory 1203) may for instance be a volatile memory. It may for instance be a DRAM memory, to give non-limiting example. It may for instance be used as a working memory for processor 1201 when executing an operating system, an application, a program, and/or the like.

Processor 1201 further controls a communication interface 1204 (e.g. radio interface) configured to receive and/or transmit data and/or information. For instance, communication interface 1204 may be configured to transmit and/or receive radio signals from a radio node, such as a base station. It is to be understood that any computer program code based processing required for receiving and/or evaluating radio signals may be stored in an own memory of communication interface 1204 and executed by an own processor of communication interface 1204 or it may be stored for example in memory 1203 and executed for example by processor 1201.

Communication interface 1204 may in particular be configured to communicate according to a cellular communication system like a 2G/3G/4G/5G or future generation cellular communication system. Mobile device 1200 may use radio interface 1204 to communicate with a base station, e.g. base stations BS of FIG. 1 or base stations/gNBs 20, 25, 26 of FIG. 2 or cells C2, C2, C3, C3, C4 of FIG. 1 or cells 1,2, 3 of FIG. 2 or 3.

For example, the communication interface 1204 may further comprise a BLE and/or Bluetooth radio interface including a BLE transmitter, receiver or transceiver. For example, radio interface 1204 may additionally or alternatively comprise a WLAN radio interface including at least a WLAN transmitter, receiver or transceiver.

The components 1202 to 1206 of mobile device 1200 may for instance be connected with processor 1201 by means of one or more serial and/or parallel busses.

It is to be understood that mobile device 1200 may comprise various other components. For example, mobile device 1200 may optionally comprise a user interface (e.g. a touch-sensitive display, a keyboard, a touchpad, a display, etc.).

Figure 13:
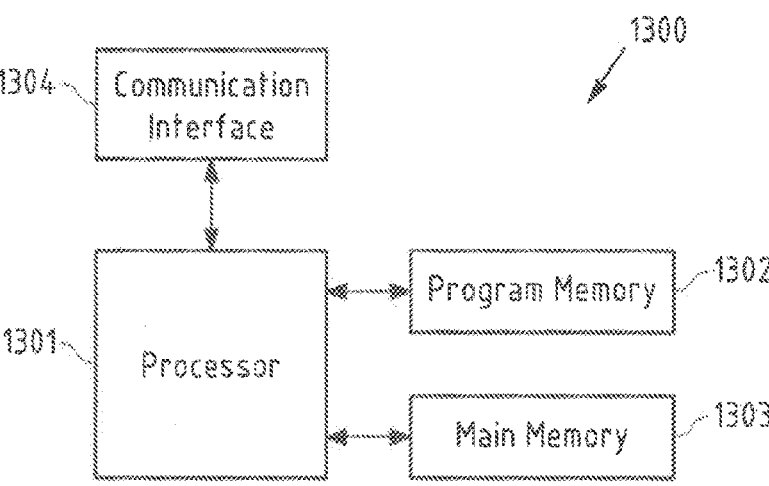
FIG. 13 is a block diagram of an exemplary embodiment of a base station.

FIG. 13 is a block diagram of an exemplary embodiment of an apparatus, such as base stations BS of FIG. 1 or base stations/gNBs 20, 25, 26 of FIG. 2 generating cells C2, C2, C3, C3, C4 of FIG. 1 or cells 1,2, 3 of FIG. 2 or 3. For instance, apparatus 1300 may be configured for receiving and processing scheduling request sent by apparatus 1300 as described above.

Apparatus 1300 comprises a processor 1301. Processor 1301 may represent a single processor or two or more processors, which are for instance at least partially coupled, for instance via a bus. Processor 1301 executes a program code stored in program memory 1302 (for instance program code causing apparatus 1300 to perform together with apparatus 1200 embodiments according to the present disclosure or parts thereof), and interfaces with a main memory 1303.

Program memory 1302 may also comprise an operating system for processor 1301. Some or all of memories 1302 and 1303 may also be included into processor 1301.

Moreover, processor 1301 controls a communication interface 1304 which is for example configured to communicate according to a cellular communication system like a 2G/3G/4G/5G cellular communication system. Communication interface 1304 of apparatus 1300 may be provided for communication between a base station or gNB and a UE (such as illustrated in FIGS. 1, 2, 3 and 4).

The components 1302 to 1305 of apparatus 1300 may for instance be connected with processor 1301 by means of one or more serial and/or parallel busses.

It is to be understood that apparatuses 1200, 1300 may comprise various other components.

Figure 14:
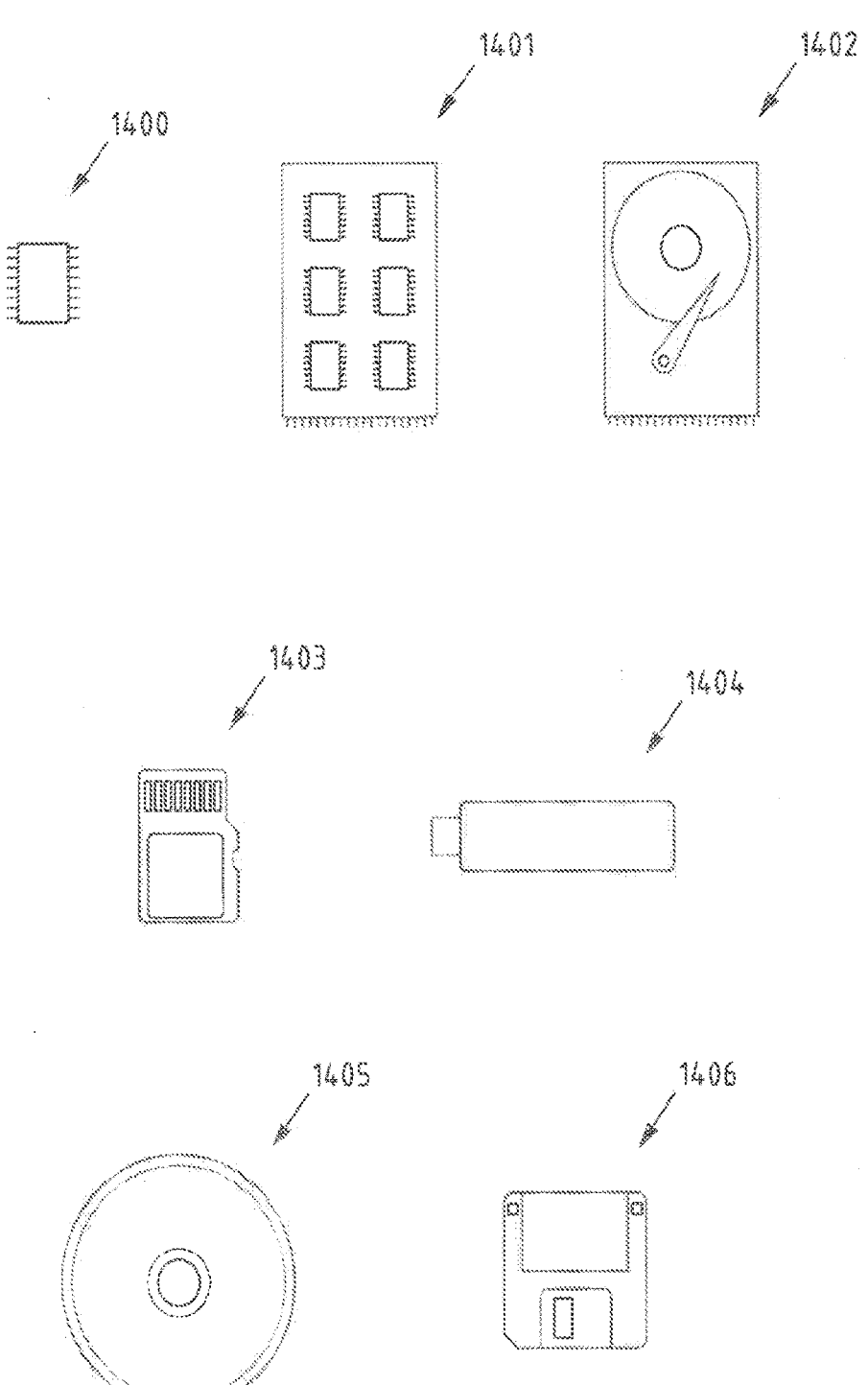
FIG. 14 is a schematic illustration of examples of tangible and non-transitory computer-readable storage media.

FIG. 14 is a schematic illustration of examples of tangible and non-transitory computer-readable storage media according to the present disclosure that may for instance be used to implement memory 1202 of FIG. 12 or memory 1302 of FIG. 13. To this end, FIG. 14 displays a flash memory 1400, which may for instance be soldered or bonded to a printed circuit board, a solid-state drive 1401 comprising a plurality of memory chips (e.g. Flash memory chips), a magnetic hard drive 1402, a Secure Digital (SD) card 1403, a Universal Serial Bus (USB) memory stick 1404, an optical storage medium 1405 (such as for instance a CD-ROM or DVD) and a magnetic storage medium 1406.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to sections of processor(s)/software (including digital signal processor(s)), software, and memory (ies) that work together to cause an apparatus, such as a mobile phone, to perform various functions) and (c) to circuits, such as a microprocessor(s) or a section of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 1201 and 1301 of FIGS. 12 and 13, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (i) A, or (ii) B, or (iii) C, or (iv) A and B, or (v) A and C, or (vi) B and C, or (vii) A and B and C.

It will be understood that the embodiments disclosed herein are only exemplary, and that any feature presented for a particular exemplary embodiment may be used with any aspect of the present disclosure on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. A mobile device comprising:

at least one memory storing computer program code; and at least one processor configured to execute the computer program code and cause the mobile device to perform:

initiating a time-to-trigger procedure for evaluating a measurement event condition with respect to a neighboring cell of a mobile network;

storing information related to a beam, which is or was used by the mobile device at the time of initiating the time-to-trigger procedure, wherein that beam that is or was used by the mobile device is a beam used by the mobile device for establishing a radio link connection with a serving cell of the mobile network; and providing the stored beam related information to the mobile network, wherein the stored beam related information is based on or comprises:

a beam identifier;

an identifier of a beam-specific cell individual offset;

an index of a synchronization signal block; and an index of a channel state information reference signal.

2. The mobile device of the claim 1, wherein the stored beam related information is provided to the mobile network as part of:

a measurement report;

a re-establishment request;

a radio link failure report; and a successful handover report.

3. The mobile device of claim 1, wherein the stored beam related information is provided to:

the serving cell;

the neighboring cell used as a target cell for a handover; and a third cell of the mobile network.

4. The mobile device of claim 1, wherein the stored beam related information is provided to the mobile network during or after the time-to-trigger procedure.

5. The mobile device of claim 1, wherein the mobile device is further caused to perform switching to a new beam during the time-to-trigger procedure.

6. The mobile device of claim 1, wherein the mobile device is further caused to perform receiving a handover command for a handover from the serving cell to the neighboring cell used as a target cell.

7. The mobile device of claim 1, wherein the mobile device is further caused to perform deleting the stored beam related information or allowing the stored beam related information to be deleted, when a time has passed;

an acknowledgment for a measurement report, the measurement report comprising the stored beam related information, is received;

a handover command is received;

the time-to-trigger procedure is stopped; and a further time-to-trigger procedure is initiated.

8. A method, performed by at least a mobile device, the method comprising:

initiating a time-to-trigger procedure for evaluating a measurement event condition with respect to a neighboring cell of a mobile network;

storing information related to a beam, which is or was used by the mobile device at the time of initiating the time-to-trigger procedure, wherein that beam that is or was used by the mobile device is a beam used by the mobile device for establishing a radio link connection with a serving cell of the mobile network; and providing the stored beam related information to the mobile network, wherein the method further comprises:

deleting the stored beam related information or allowing the stored beam related information to be deleted, when a time has passed;

an acknowledgment for a measurement report, the measurement report comprising the stored beam related information, is received;

a handover command is received;

the time-to-trigger procedure is stopped; and a further time-to-trigger procedure is initiated.

\* \* \* \* \*